(12) United States Patent
Tang et al.

(10) Patent No.: US 11,061,290 B1
(45) Date of Patent: Jul. 13, 2021

(54) LIQUID CRYSTAL MODULE, SPATIAL LIGHT MODULATOR, HOLOGRAPHIC 3D DISPLAY DEVICE, AND DRIVING METHOD

(71) Applicant: Shanghai Tianma Micro-Electronics Co., Ltd., Shanghai (CN)

(72) Inventors: Shihao Tang, Shanghai (CN); Yang Zeng, Shanghai (CN); Qijun Yao, Shanghai (CN); Xiaoyue Su, Shanghai (CN); Feng Lu, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 0 days.

(21) Appl. No.: 16/911,978

(22) Filed: Jun. 25, 2020

(30) Foreign Application Priority Data

Mar. 2, 2020 (CN) .......................... 202010135721.9

(51) Int. Cl.
| | |
|---|---|
| *G02F 1/1343* | (2006.01) |
| *G02F 1/1362* | (2006.01) |
| *G02B 5/32* | (2006.01) |
| *G02F 1/139* | (2006.01) |

(52) U.S. Cl.
CPC ......... *G02F 1/134309* (2013.01); *G02B 5/32* (2013.01); *G02F 1/139* (2013.01); *G02F 1/136213* (2013.01); *G02F 1/134345* (2021.01); *G02F 2201/52* (2013.01)

(58) Field of Classification Search
None
See application file for complete search history.

(56) References Cited

U.S. PATENT DOCUMENTS

| | | | |
|---|---|---|---|
| 2012/0154368 A1* | 6/2012 | Sakurai ................ | G09G 3/3659 345/212 |
| 2014/0002762 A1* | 1/2014 | Iwata ................ | G02F 1/134309 349/42 |
| 2014/0104518 A1* | 4/2014 | Saitou .................... | G02B 30/27 349/15 |
| 2014/0192298 A1* | 7/2014 | Sumiyoshi ........... | H04N 13/356 349/96 |
| 2017/0270853 A1* | 9/2017 | Xiang .................. | G09G 3/3275 |

(Continued)

FOREIGN PATENT DOCUMENTS

| | | |
|---|---|---|
| CN | 104299575 B | 1/2017 |
| CN | 208622782 U | 3/2019 |

*Primary Examiner* — Ryan Crockett
(74) *Attorney, Agent, or Firm* — Anova Law Group PLLC

(57) ABSTRACT

A liquid crystal module includes an array substrate, a color film substrate, and a liquid crystal layer. The array substrate and the color film substrate are disposed oppositely. The liquid crystal layer is disposed between the array substrate and the color film substrate. The array substrate includes a pixel electrode and a capacitor metal layer arranged on a side of the pixel electrode away from the liquid crystal layer. The capacitor metal layer and the pixel electrode form a storage capacitor. The color film substrate includes a reset electrode assembly. In a reset period, the reset electrode assembly is configured to access to a reset voltage signal to orient liquid crystal molecules along a first orientation direction. The reset electrode assembly includes an adjustment structure. During the reset period, the adjustment structure is configured to reduce a capacitive reactance load when the reset voltage signal is turned off.

17 Claims, 13 Drawing Sheets

(56) References Cited

U.S. PATENT DOCUMENTS

| | | | | |
|---|---|---|---|---|
| 2019/0326376 A1* | 10/2019 | Huo | ................... | H01L 27/3262 |
| 2020/0402458 A1* | 12/2020 | Gao | ................... | G09G 3/3233 |
| 2020/0410924 A1* | 12/2020 | Xiong | ................. | G09G 3/32 |
| 2021/0066364 A1* | 3/2021 | Lu | ................... | H01L 27/14603 |

* cited by examiner

LIQUID CRYSTAL MODULE, SPATIAL LIGHT MODULATOR, HOLOGRAPHIC 3D DISPLAY DEVICE, AND DRIVING METHOD

CROSS-REFERENCE TO RELATED APPLICATION

This application claims priority to Chinese Patent Application No. 202010135721.9, filed on Mar. 2, 2020, the entire content of which is incorporated herein by reference.

TECHNICAL FIELD

The present disclosure generally relates to the 3D display technology field and, more particularly, to a liquid crystal module, a spatial light modulator, a holographic 3D display device, and a driving method.

BACKGROUND

Nowadays, electronic devices with display functions are widely used. The electronic devices bring great convenience and become an essential tool in current society.

A liquid crystal module is a main display component for an electronic device to realize the display function. The existing liquid crystal module has a large capacitive reactance load, which impacts display quality.

SUMMARY

Embodiments of the present disclosure provide a liquid crystal module including an array substrate, a color film substrate, and a liquid crystal layer. The array substrate and the color film substrate are disposed oppositely. The liquid crystal layer is disposed between the array substrate and the color film substrate. The array substrate includes a pixel electrode and a capacitor metal layer disposed on a side of the pixel electrode away from the liquid crystal layer. The capacitor metal layer and the pixel electrode form a storage capacitor. The color film substrate includes a reset electrode assembly. In a reset period, the reset electrode assembly is configured to access to a reset voltage signal to orient liquid crystal molecules along a first orientation direction. The reset electrode assembly includes an adjustment structure. In the reset period, the adjustment structure is configured to reduce a capacitive reactance load of the reset electrode assembly on the pixel electrode when the reset voltage signal is turned off.

Embodiments of the present disclosure provide a spatial light modulator including a liquid crystal module. The liquid crystal module includes an array substrate, a color film substrate, and a liquid crystal layer. The array substrate and the color film substrate are disposed oppositely. The liquid crystal layer is disposed between the array substrate and the color film substrate. The array substrate includes a pixel electrode and a capacitor metal layer disposed on a side of the pixel electrode away from the liquid crystal layer. The capacitor metal layer and the pixel electrode form a storage capacitor. The color film substrate includes a reset electrode assembly. In a reset period, the reset electrode assembly is configured to access to a reset voltage signal to orient liquid crystal molecules along a first orientation direction. The reset electrode assembly includes an adjustment structure. In the reset period, the adjustment structure is configured to reduce a capacitive reactance load of the reset electrode assembly on the pixel electrode when the reset voltage signal is turned off.

Embodiments of the present disclosure provide a driving method of a liquid crystal module. A driving circle of a frame is equally divided into a first driving period, a second driving period, and a third driving period. The first driving period includes a first reset period of liquid crystal molecules corresponding to first color pixels. The second driving period includes a second reset period of liquid crystal molecules corresponding to second color pixels. The third driving period includes a third reset period of liquid crystal molecules corresponding to third color pixels. The driving method includes: in the first driving period, charging a storage capacitors of the first color pixels in each pixel row one by one, and in the first reset period, providing a reset voltage signal to a reset electrode assembly of the first color pixels; in the second driving period, grounding the reset electrode assembly of the first color pixels, and charging corresponding pixel electrodes by the storage capacitors of the first color pixels; and in the third driving period, maintaining the reset electrode assembly of the first color pixels grounded, and lighting first color backlight, such that the first color pixels emit light for display. The liquid crystal molecules corresponding to the first color pixels are oriented in a first orientation direction. The driving electric field is formed between the pixel electrodes and the reset electrode assembly to control the liquid crystal molecules to be oriented in a second orientation direction, which is different from the first orientation direction. For driving circles of two adjacent frames, in a second driving period and a third driving period of a previous frame driving circle, and a first driving period of a following frame driving circle, the second color pixels are driven to emit light for display according to a same driving method of the first color pixels for display. In the third driving period of the previous frame driving circle, the first driving period and a second driving period of the following frame driving circle, the third color pixels are driven to emit light for display according to the same driving method of the first color pixels for display.

DETAILED DESCRIPTION

Embodiments of the present disclosure are described in detail in connection with the accompanying drawings. Embodiments described below are merely some embodiments of the present disclosure but not all the embodiments of the present disclosure. Based on embodiments of the present disclosure, all other embodiments obtained by those of ordinary skill in the art without creative efforts are within the scope of the present disclosure.

Figure 1:
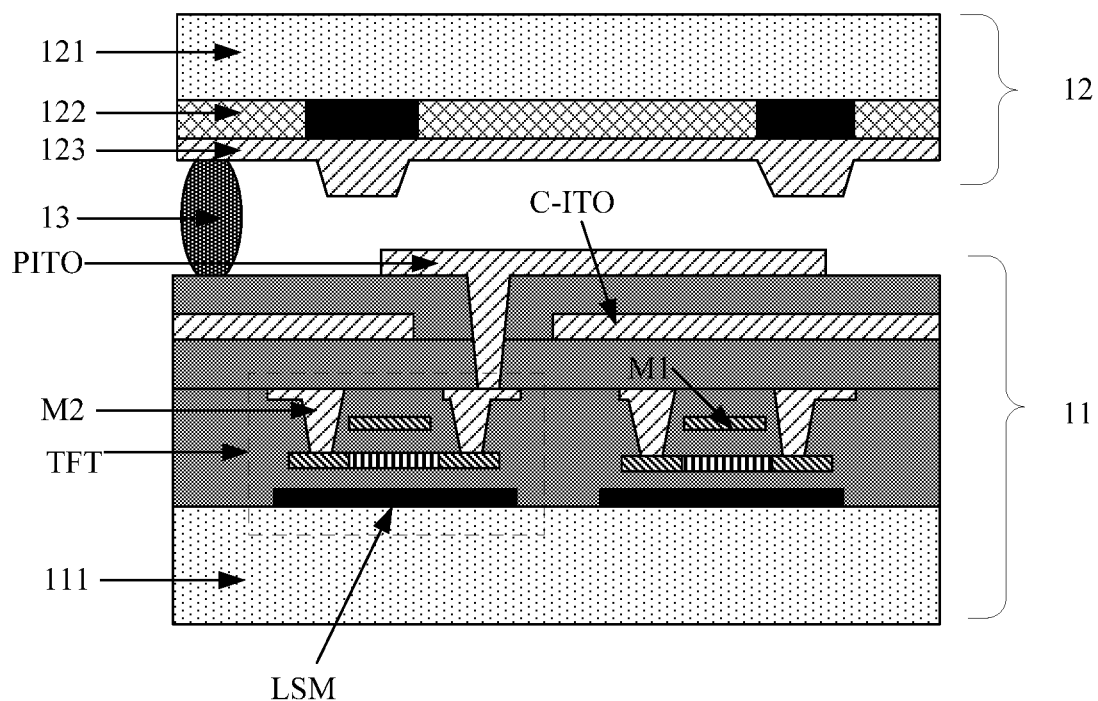
FIG. 1 illustrates a schematic structural diagram of a liquid crystal module.

FIG. 1 illustrates a schematic structural diagram a liquid crystal module. The liquid crystal module includes a color film substrate 12, an array substrate 11, and a liquid crystal (LC) layer (not shown in FIG. 1). The color film substrate 12 and the array substrate 11 are oppositely disposed. The LC layer is disposed between the color film substrate 12 and the array substrate 11. A gold ball 13 is disposed between the color film substrate 12 and the array substrate 11.

The array substrate 11 includes a transparent substrate 111. A thin film transistor TFT, a capacitor metal layer C-ITO, and a pixel electrode PITO are disposed in sequence on a side of the transparent substrate 111 facing the color film substrate 12. An insulating layer is disposed between the thin film transistor TFT and the capacitor metal layer C-ITO. Another insulating layer is disposed between the capacitor metal layer C-ITO and the pixel electrode PITO. The pixel electrode PITO is electrically connected to the thin film transistor TFT through a through-hole. The thin-film transistor TFT has a top gate structure. A light shielding layer LSM is disposed between the gate metal layer M1 and the transparent substrate 111. A channel layer is disposed between the gate metal layer M1 and the light shielding layer LSM. A source electrode and a drain electrode of the thin film transistor TFT are formed by the source and drain metal layers, respectively. In FIG. 1, the liquid crystal module includes a complementary metal-oxide-semiconductor (CMOS) structure. The color film substrate 12 includes a transparent substrate 121. A color resist layer 122 and a transparent electrode layer 123 are disposed in sequence on a side of the transparent substrate 121 facing the array substrate 11.

As shown in FIG. 1, an electric field between the pixel electrode PITO and the transparent electrode drives liquid crystal molecules to deflect to realize image display. When the electronic device switches between different frame images, the liquid crystal molecules need to be reset. As shown in FIG. 1, a self-reset of the liquid crystal molecules is required, and the reset is slow.

To speed up the reset of the liquid crystal molecules and improve a refresh rate, a reset electrode is configured on the color film substrate. By configuring the reset electrode over the color film substrate, a reset voltage is applied to the reset electrode before a following frame image is refreshed to accelerate the reset deflection of the liquid crystal molecules. As such, a high refresh rate is realized. The reset electrode needs to be provided with a slit to form a reset electric field in the liquid crystal molecules and realize the reset of the liquid crystal molecules.

The reset speed of the liquid crystal molecules may be improved by adding the reset electrode in the color film substrate. However, in a reset period, at a moment that the reset voltage signal is off, a capacitive reactance load is increased for the pixel electrode due to the existence of the reset electrode. Such capacitive reactance load causes unstable voltage of the pixel electrode, which impacts display quality.

The present disclosure provides a liquid crystal module. The liquid crystal module includes an array substrate and a color film substrate disposed opposite to the array substrate, and an LC layer disposed between the array substrate and the color film substrate. The array substrate includes a pixel electrode and a capacitor metal layer on a side of the pixel electrode away from the LC layer. The capacitor metal layer and the pixel electrode form a storage capacitor. The color film substrate includes a reset electrode assembly. In the reset period, the reset electrode assembly is configured to access to a reset voltage signal to orient the liquid crystal molecules along a first orientation direction. The reset electrode assembly includes an adjustment structure. In the reset period, the adjustment structure is configured to reduce the capacitive reactance load of the reset electrode assembly on the pixel electrode when the reset voltage signal is turned off.

The color film substrate of the liquid crystal module includes the reset electrode assembly. In the reset period, the reset electrode assembly may access the reset voltage signal to cause the crystal molecules at the first orientation direction to accelerate the reset of the liquid crystal molecules. The reset electrode assembly includes the adjustment structure. When the reset voltage signal is turned off, the capacitive reactance load of the reset electrode assembly on the pixel electrode may be reduced through the adjustment structure to improve the display quality.

To make the above-described objectives, features, and advantages more comprehensible, the present disclosure is further described in connection with the accompanying drawings and specific embodiments.

Figure 2:
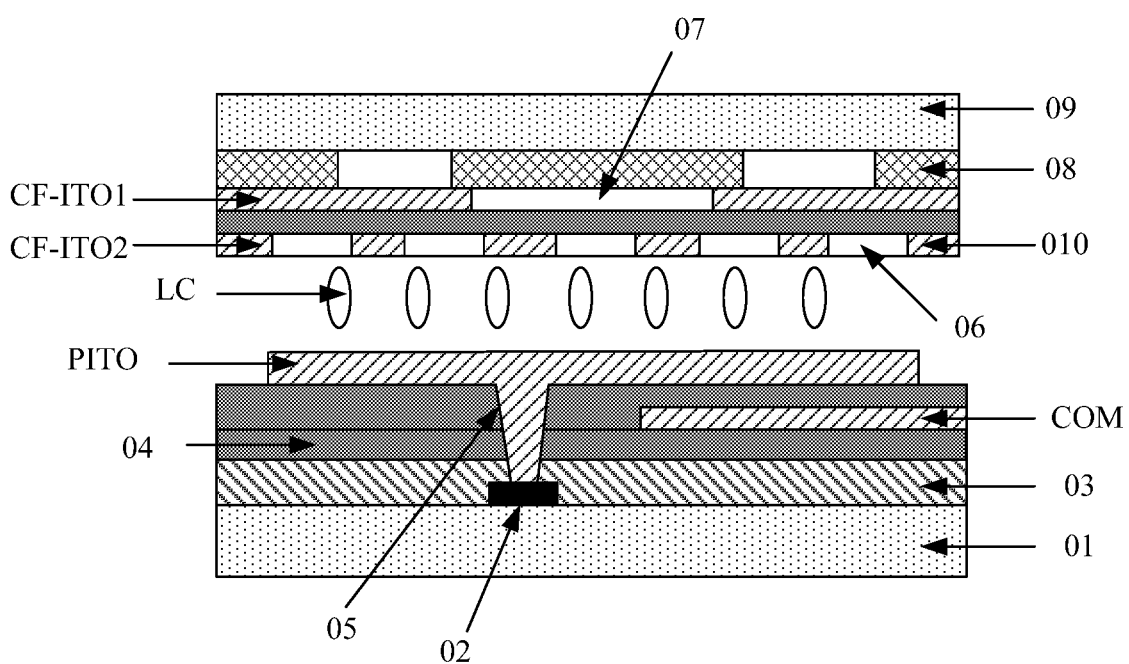
FIG. 2 illustrates a schematic structural diagram of a liquid crystal module according to some embodiments of the present disclosure.
Figure 3:
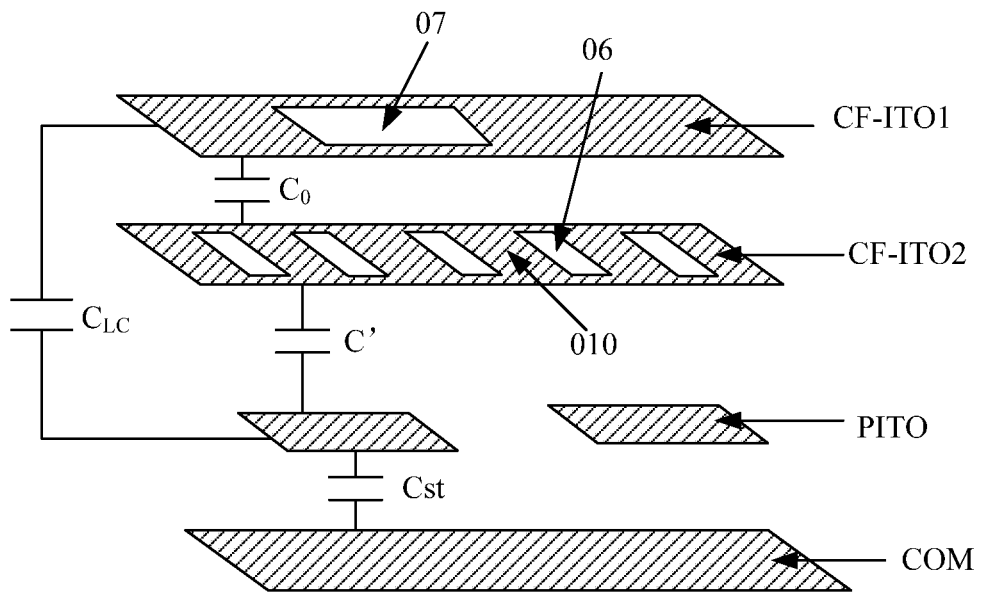
FIG. 3 illustrates an electrode structure and equivalent circuit diagram of the liquid crystal module shown in FIG. 2 according to some embodiments of the present disclosure.

FIG. 2 illustrates a schematic structural diagram of a liquid crystal module according to some embodiments of the present disclosure. FIG. 3 illustrates an electrode structure and equivalent circuit diagram of the liquid crystal module shown in FIG. 2 according to embodiments of the present disclosure. The liquid crystal module includes an array substrate and a color film substrate oppositely disposed, and an LC layer disposed between the array substrate and the color film substrate. The array substrate includes a pixel electrode PITO and a capacitor metal layer COM-ITO disposed on a side of the pixel electrode PITO away from the LC layer. The capacitor metal layer COM-ITO and the pixel electrode PITO form a storage capacitor Cst. The color film substrate includes a reset electrode assembly. In the reset period, the reset electrode assembly is configured to access the reset voltage signal to cause the liquid crystal molecules in the first orientation direction. The reset electrode assembly includes an adjustment structure. In the reset period, the adjustment structure is configured to reduce the capacitive reactance load of the reset electrode assembly on the pixel electrode when the reset voltage signal is turned off.

The pixel electrode PITO and the capacitor metal layer COM-ITO are transparent electrodes including but not limited to ITO. The pixel electrode PITO and the capacitor metal layer COM-ITO may also be other metal oxide transparent electrodes.

In the above-described liquid crystal module, the reset electrode assembly includes a first electrode layer CF-ITO2 and a second electrode layer CF-ITO1. The first electrode layer CF-ITO2 includes a plurality of stripe electrodes 010. The plurality of strip-shaped electrodes 010 are disposed along a first direction. A gap 06 exists between each of two adjacent strip-shaped electrodes 010. The second electrode layer CF-ITO1 is disposed on a side of the first electrode layer CF-ITO2 away from the LC layer. As shown in FIG. 2 and FIG. 3, the adjustment structure includes a through-hole 07 disposed at the second electrode layer CF-ITO1. In a direction perpendicular to a plane where the array substrate is, the through-hole 07 overlaps at least partially with the pixel electrode PITO. The first electrode layer CF-ITO2 is electrically connected to a first signal terminal (not shown in FIG. 2 and FIG. 3). The second electrode layer CF-ITO1 is electrically connected to a second signal terminal (not shown in FIG. 2 and FIG. 3). The reset voltage signals of the first signal terminal and the second signal terminal are different. Therefore, a reset voltage is formed between the first electrode layer CF-ITO2 and the second electrode layer CF-ITO1.

The first electrode layer CF-ITO2 and the second electrode layer CF-ITO1 include but are not limited to ITO, and may also include other metal oxide transparent electrodes or metal grid electrodes.

In some embodiments, the array substrate includes a first transparent substrate 01, and a thin film transistor TFT, the capacitor metal layer COM-ITO, and the pixel electrode PITO that are disposed on a side of the first transparent substrate 01 facing the LC layer in sequence. An insulating layer 04 is disposed between the thin film transistor TFT and the capacitor metal layer COM-ITO. An insulating layer 04 is disposed between the pixel electrode PITO and the capacitor metal layer COM-ITO. The pixel electrode PITO is electrically connected to the thin film transistor TFT by a through-hole 05. The color film substrate includes a second transparent substrate 09, and a color resist layer 08, the second electrode layer CF-ITO1, and the first electrode layer CF-ITO2 that are disposed on a side of the second transparent substrate 09 facing the LC layer in sequence. An insulating layer 04 exists between the second electrode layer CF-ITO1, and the first electrode layer CF-ITO2. The color resist layer 08 may include a red-color block corresponding to red pixels, a green-color block corresponding to green pixels, and a blue-color block corresponding to blue pixels.

In a device with a high refresh rate, if time sequences of resetting the liquid crystal molecules and writing the pixel voltage are separated, the pixel voltage writing time is too short. Thus, the time sequences of resetting and writing the pixel voltage overlap with each other to perform the resetting and the pixel voltage writing simultaneously. Since the reset electrodes have the capacitive reactance load on the pixel electrode PITO, the resetting voltage may impact the stability of the pixel voltage to impact the display quality. Therefore, the problem of generating the capacitive reactance load on the pixel electrode PITO due to different resistance and capacitance of the reset electrode assembly.

At time moment $t_0$, when a pixel is written, the voltages of the second electrode layer CF-ITO1 and the first electrode layer CF-ITO2 are $U1(t_0)$ and $U2(t_0)$, respectively, and the pixel voltage is $Up(t_0)$. At time moment $t_1$, when the liquid crystal molecules resetting is completed, the voltages of the second electrode layer CF-ITO1 and the first electrode layer CF-ITO2 are reduced to 0 V, and the pixel voltage is $Up(t_1)$. From time moment $t_1$ to the time moment when the pixel is displayed, the pixel is deflected at a voltage of $Up(t_1)$. A capacitance of the second electrode layer CF-ITO1 and the pixel electrode PITO is $C_{LC}$, and a capacitance of the second electrode layer CF-ITO1 and the pixel electrode PITO is $C'$. The pixel electrode PITO and the capacitor metal layer COM-ITO form the storage capacitor Cst. A mutual capacitor between the second electrode layer CF-ITO1 and the first electrode layer CF-ITO2 is $C_0$. Based on the charge conservation law, the following equation exists:

$$(U1(t_0)-U2(t_0))*C_0+C_{LC}*(Up(t_0)-U2(t_0))+C'*(Up(t_0)-U1(t_0))+Cst*Up(t_0)=C_{LC}*Up(t_1)+C'*Up(t_1)+Cst*Up(t_1)$$

To set a driving time sequence, $t_1$ and $t_0$ are both constants. For a determined reset voltage, $U1(t_0)$ and $U2(t_0)$ are both constants. For the pixel electrode PITO with determined parameters, the predetermined first electrode layer CF-ITO2, and the capacitor metal layer COM-ITO, the storage capacitor Cst and capacitor C' are also constants. In the above-described equation, after the through-hole 07 is disposed at the second electrode layer CF-ITO1, based on the location and dimension of the through-hole 07, the mutual capacitor $C_0$ and the capacitor $C_{LC}$ are caused to be different. Thus, in the above-described equation, only the mutual capacitor $C_0$, capacitor $C_{LC}$, the pixel voltage $Up(t_1)$, and the pixel voltage $Up(t_0)$ are not determined. Therefore, the above-described equation is simplified as:

$$Up(t_1)=f(C', C_{LC}*Up(t_0)) \quad (1)$$

Based on the above functional relationship (1), by setting at least one of the numbers, the position, or the dimension of the through-hole 07, the mutual capacitor $C_0$, capacitor $C_{LC}$ may be changed. Adaptation data is selected among multiple sets of data, so that the difference between the pixel voltage Up ($t_1$) and the pixel voltage Up ($t_0$) is as small as possible. When the difference is smaller than a predetermined threshold or equal to 0, the capacitive reactance load of the reset electrode assembly on the pixel electrode PITO may be reduced or even avoided.

Figure 4:
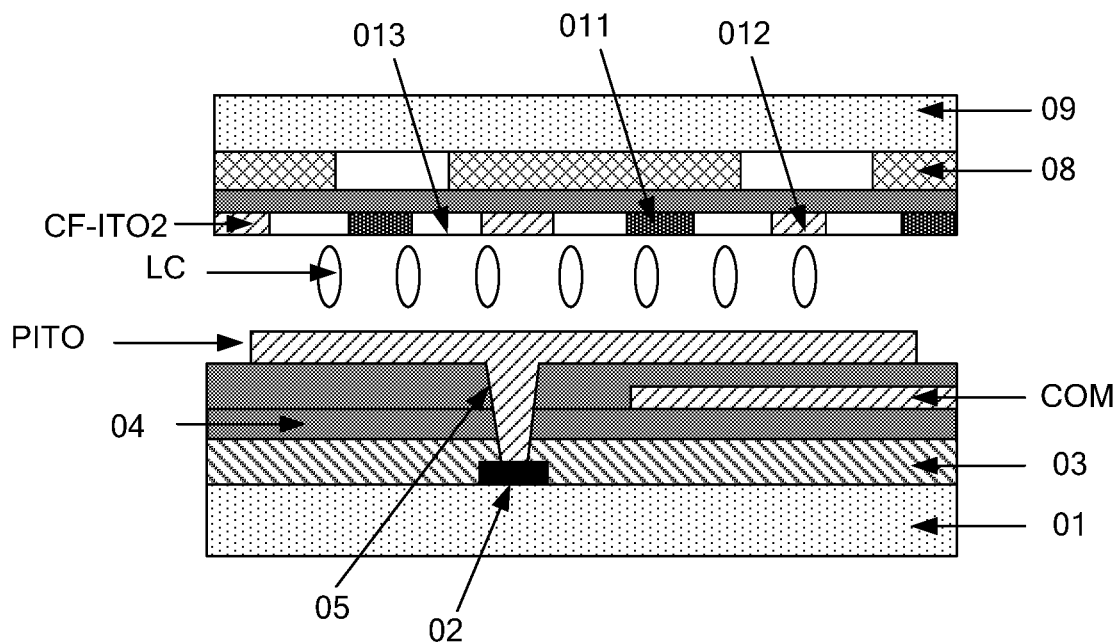
FIG. 4 illustrates a schematic structural diagram of another liquid crystal module according to some embodiments of the present disclosure.
Figure 5:
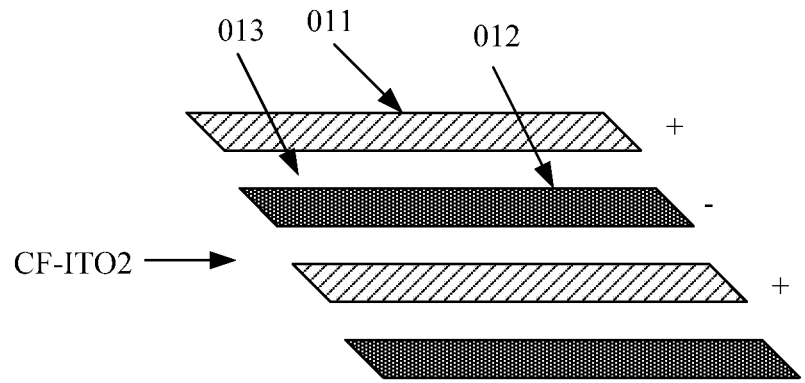
FIG. 5 illustrates an electrode structure and equivalent circuit diagram of the liquid crystal module shown in FIG. 4 according to some embodiments of the present disclosure.

In some embodiments, FIG. 4 illustrates a schematic structural diagram of another liquid crystal module according to embodiments of the present disclosure. FIG. 5 illustrates an electrode structure and equivalent circuit diagram of the liquid crystal module shown in FIG. 4 according to embodiments of the present disclosure. The liquid crystal module shown in FIG. 4 and FIG. 5 has a different structure of the reset electrode assembly compared to the liquid crystal module shown in FIG. 2 and FIG. 3.

As shown in FIG. 4 and FIG. 5, the reset electrode assembly includes the first electrode layer CF-ITO2. The first electrode layer CF-ITO2 includes a plurality of strip-shaped electrodes. The plurality of strip-shaped electrodes are disposed along the first direction in sequence. A gap 013 is disposed between two adjacent strip-shaped electrodes. The first direction is perpendicular to the extension of the strip-shaped electrodes. The strip-shaped electrodes are the same.

As shown in FIG. 4 and FIG. 5, the plurality of strip-shaped electrodes include a plurality of first strip-shaped electrodes 011 and second strip-shaped electrodes 012 that are alternatively disposed. The first strip-shaped electrodes 011 are electrically connected to a third signal terminal (not shown in FIG. 4 and FIG. 5) that outputs a first reset voltage. The second strip-shaped electrode 012 is electrically connected to a fourth signal terminal (not shown in FIG. 4 and FIG. 5) that outputs a second reset voltage. The phase of the first reset voltage is opposite to the phase of the second reset voltage. The adjustment structure includes the first strip-shaped electrodes 011 and second strip-shaped electrodes 012.

Since the phase of the input reset voltage of the first strip-shaped electrodes 011 is opposite to the phase of the input reset voltage of the second strip-shaped electrodes 012, the capacitive reactance loads of the first strip-shaped electrode 011 and the second strip-shaped electrode 012 on another same conductive layer also have opposite signs. If one of the first strip-shaped electrodes 011 and the second strip-shaped electrodes 012 increases the capacitive reactance loads of the conductive layer, the other one of the second strip-shaped electrodes 012 and the first strip-shaped electrodes 011 may decrease the capacitive reactance loads of the conductive layer. Therefore, the capacitive reactance loads caused by the first strip-shaped electrodes 011 and the second strip-shaped electrodes 012 can cancel each other out, such that the capacitive reactance loads thereof on other conductive layers are reduced or even eliminated. Therefore, this example may reduce the capacitive reactance load on the pixel electrode PITO.

The amplitude of the reset voltage input by any two adjacent strip electrodes may be set the same. That is, the first reset voltage input by the first strip electrode 011 and the second reset voltage input by the second strip electrode 012 have opposite signs but the same amplitude. As such, the capacitive reactance loads on the other conductive layers may cancel each other out to achieve the best effect of eliminating the capacitive reactance loads.

Figure 6:
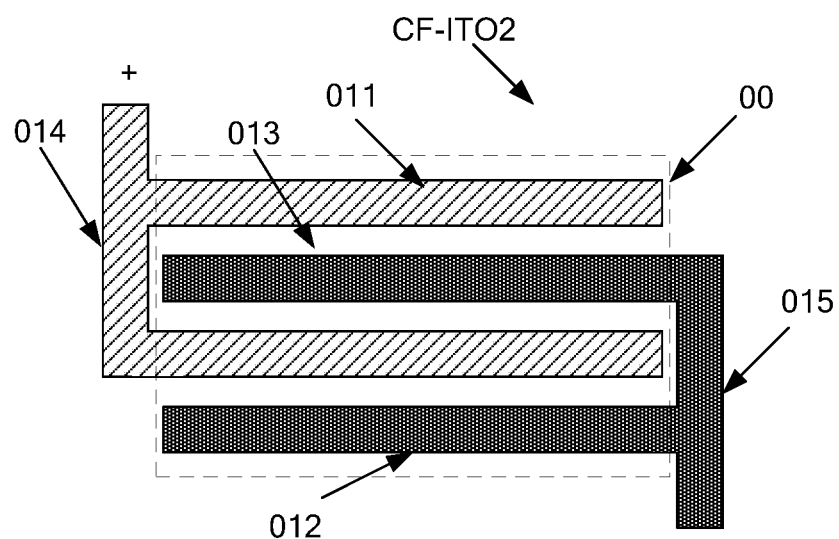
FIG. 6 illustrates an electrode structure and equivalent circuit diagram of a liquid crystal module according to some embodiments of the present disclosure.

FIG. 6 illustrates an electrode structure and equivalent circuit diagram of the liquid crystal module according to some embodiments of the present disclosure. This example is based on the example shown in FIG. 5. The first electrode layer CF-ITO2 includes a first comb-shaped electrode 014 and a second comb-shaped electrode 015 that are nested with each other. The first comb-shaped electrode 014 includes the first strip electrode 011, the second comb-shaped electrode 015 includes the second strip electrode 012. The first comb-shaped electrode 014 is connected to the third signal terminal to input the first reset voltage for the first strip electrode 011 simultaneously. The first comb-shaped electrode 015 is connected to the fourth signal terminal to input the first reset voltage for the first strip electrode 012 simultaneously. As such, compared to the example shown in FIG. 5, this example requires only one third signal terminal and one fourth signal terminal to save the number of signal terminals.

As shown in FIG. 5 and FIG. 6, the corresponding liquid crystal module display area 00 is rectangular. The extending direction of the strip electrode of the first electrode layer CF-ITO2 is parallel to a side of the rectangular display area 00. In some other embodiments, the structure of the first electrode layer CF-ITO2 is as shown in FIG. 7.

Figure 7:
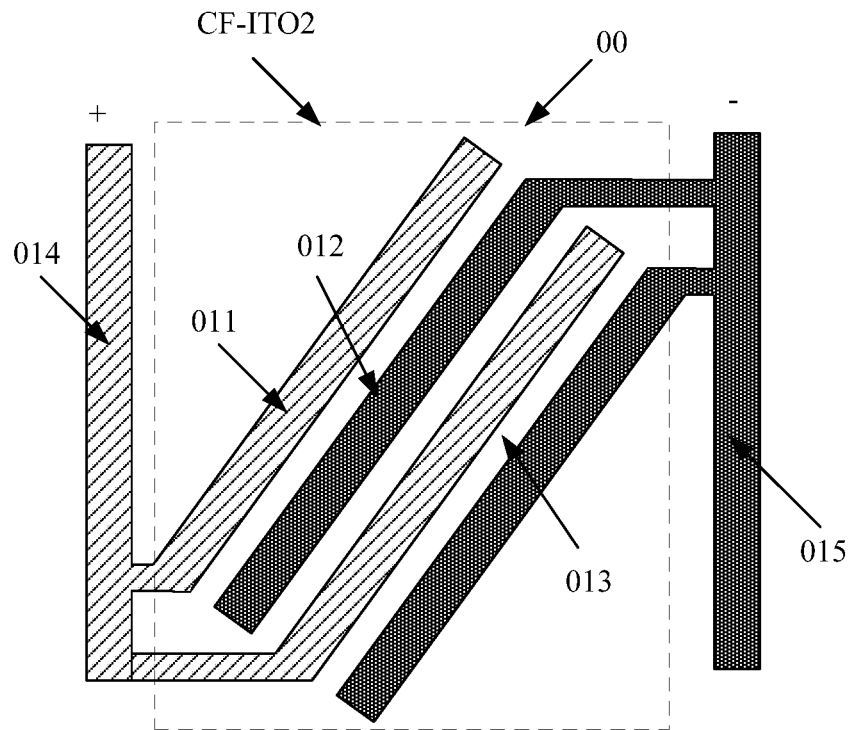
FIG. 7 illustrates an electrode structure and equivalent circuit diagram of another liquid crystal module according to some embodiments of the present disclosure.

FIG. 7 illustrates another electrode structure and equivalent circuit diagram of the liquid crystal module according to some embodiments of the present disclosure. In some embodiments, a difference between the example shown in FIG. 7 and the one shown in FIG. 6 is that the extending direction of the strip electrode is not parallel to the side of the rectangular display area 00, and has an angle greater than 0° and less than 90° with a side of the rectangular display area 00. In some embodiments of the present disclosure, regardless of whether the reset electrode component uses a single electrode layer or a two-layer electrode layer structure, the extending direction of the strip electrodes in the first electrode layer CF-ITO2 may be set based on requirements, and is not limited to the setting shown in embodiments of the present disclosure.

Figure 8:
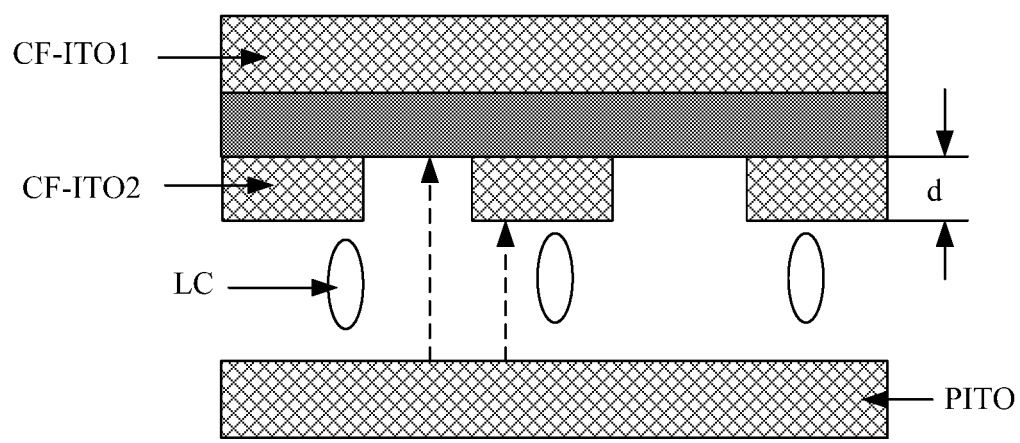
FIG. 8 illustrates a schematic principle diagram of optical path difference in a liquid crystal module according to some embodiments of the present disclosure.

FIG. 8 illustrates a schematic principle diagram of optical path difference in a liquid crystal module according to some embodiments of the present disclosure. The reset electrode component at least includes a patterned first electrode layer CF-ITO2. As shown in FIG. 8, the reset electrode component also includes a patterned second electrode layer CF-ITO1. The first electrode layer CF-ITO2 includes a plurality of strip electrodes. The plurality of the strip electrodes is disposed along the first direction in sequence. A gap is disposed between two adjacent strip electrodes. The thickness of the first electrode layer CF-ITO2 is set to d. When light passes through the gap and non-gap regions of the first electrode layer CF-ITO2, the refractive index of the first electrode layer CF-ITO2 is n2, and the refractive index of the gap region is n1. The first electrode layer CF-ITO2 of the structure may cause an optical path difference of $(n2-n1)*d$ after the light passes through the strip electrode and the gap, which may cause a phase difference and affect the 3D display effect.

A first compensation electrode layer may be configured to solve the problem of the optical path difference caused by the gap in the first electrode layer CF-ITO2. The reset electrode component includes a second electrode layer CF-ITO1 and a first electrode layer CF-ITO2 as an example for illustration.

Figure 9:
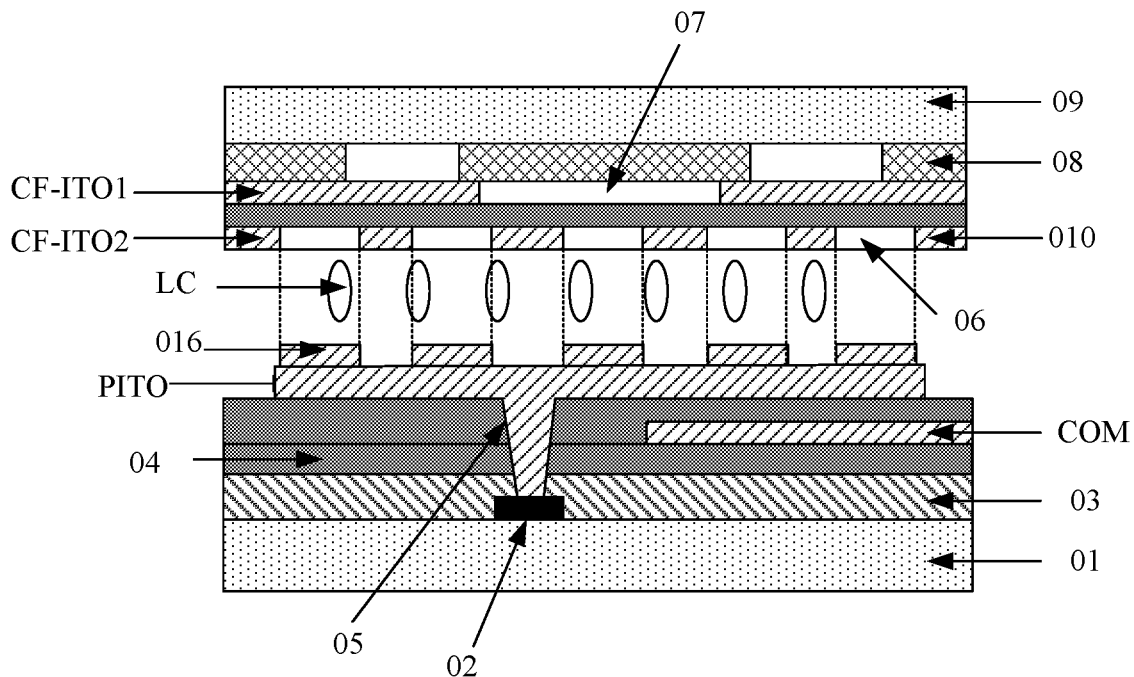
FIG. 9 illustrates a schematic structural diagram of another liquid crystal module according to some embodiments of the present disclosure.

FIG. 9 illustrates a schematic structural diagram of another liquid crystal module according to some embodiments of the present disclosure. The liquid crystal module includes a first compensation electrode layer, which includes a plurality of first compensation electrodes 016. For example, the first compensation electrode layer may be a patterned electrode layer. As shown in FIG. 9, the orthographic projection of the first compensation electrode 016 on the first electrode layer CF-ITO2 covers at least a part of the gap 06 in the first electrode layer CF-ITO2. The first compensation electrode layer may reduce or eliminate the optical path difference caused by gap 06 in the first electrode layer CF-ITO2.

The orthographic projection of the first compensation electrode 016 on the first electrode layer CF-ITO2 is adjoined to the strip electrode 010 of the first electrode layer CF-ITO2. As shown by the dotted line in FIG. 9, the orthographic projection of the first compensation electrode 016 on the first electrode layer CF-ITO2 covers the gap 06 without exceeding the gap 06. As such, the above-described optical path difference may be better reduced or eliminated caused by gap 06 in the first electrode layer CF-ITO2.

The first electrode layer CF-ITO2 and the first compensation electrode layer may be configured as the transparent electrodes with the same refractive index and the same thickness to better reduce or eliminate the above-described optical path difference caused by the gap in the first electrode layer CF-ITO2 06. When the orthographic projection of the first compensation electrode 016 on the first electrode layer CF-ITO2 is configured to cover the gap 010 and does not exceed the gap 010, the above-described optical path difference caused by the gap 06 in the first electrode layer CF-ITO2 may be eliminated.

The first compensation electrode layer is disposed on a side of the pixel electrode PITO, and the first compensation electrode layer may contact the pixel electrode PITO. As shown in FIG. 9, the first compensation electrode layer is disposed on the surface of a side of the pixel electrode PITO facing the LC layer. In some embodiments, the first compensation electrode layer may also be disposed on the surface of a side of the pixel electrode PITO away from the LC layer. The first compensation electrode layer electrically contacts the pixel electrode PITO, and the set gap 06 is configured to directly face the pixel electrode PITO. As such, all the first compensation electrodes 016 are disposed on the surface of the pixel electrode PITO. The added first compensation electrode layer does not increase the surface area of the capacitance facing directly to the pixel electrode PITO, and does not change the size of the capacitance of the pixel electrode PITO. In addition, the first compensation electrode layer and the pixel electrode PITO are in contact with the same potential, which does not affect potentials of other conductive layers. The first compensation electrode layer can also reduce the impedance of the pixel electrode PITO, and reduce power consumption.

Figure 10:
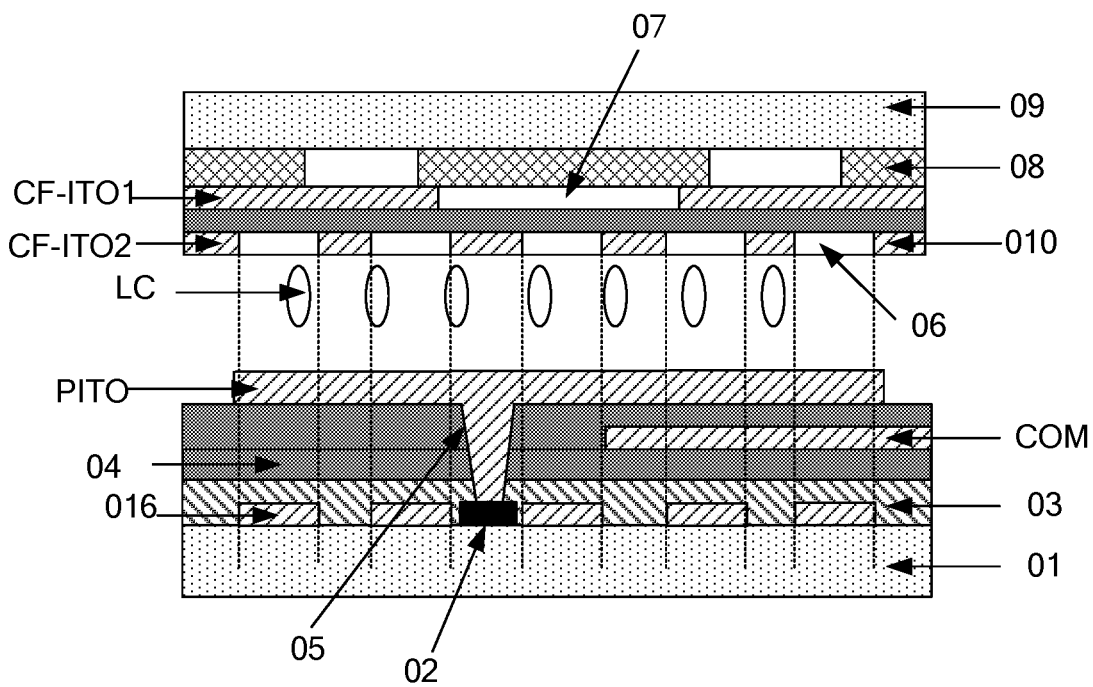
FIG. 10 illustrates a schematic structural diagram of another liquid crystal module according to some embodiments of the present disclosure.

In some embodiments, 10. FIG. 10 illustrates a schematic structural diagram of another liquid crystal module according to some embodiments of the present disclosure. The difference between the example described in FIG. 10 and the example described in FIG. 9 is that the first compensation electrode layer is provided at a different position. The array substrate includes a first transparent substrate 01, and the first compensation electrode layer is disposed on a side of the first transparent substrate 01. The first compensation electrode layer contacts the first transparent substrate 01. As shown in FIG. 10, the first compensation electrode layer is disposed on a surface of the first transparent substrate 01 facing the LC layer. In some embodiments, the first compensation electrode layer may also be disposed on the surface of a side of the pixel electrode PITO away from the LC layer. The first transparent substrate 01 may be a glass substrate. Compared to the example shown in FIG. 9, the example described in FIG. 10 does not change the flatness of the pixel electrode PITO. Compared to the conductive layer with an additional separate potential layer, the number of capacitors of the equivalent circuit is increased. Although the equivalent circuit is relatively complex, the design parameters of the first electrode layer CF-ITO2 may also be set based on the charge conservation law to solve the above-described capacitive reactance load problem.

Figure 11:
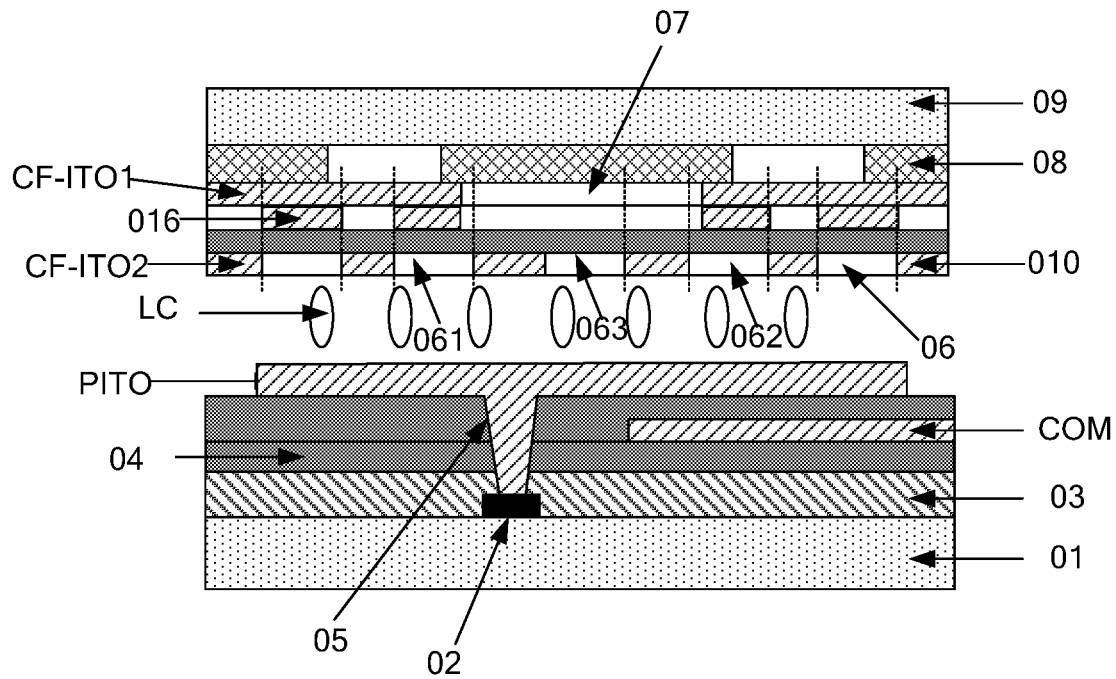
FIG. 11 illustrates a schematic structural diagram of another liquid crystal module according to some embodiments of the present disclosure.

In some embodiments, FIG. 11 illustrates a schematic structural diagram of another liquid crystal module according to some embodiments of the present disclosure. Based on the example shown in FIG. 9, the reset electrode assembly includes a second electrode layer CF-ITO1 disposed on a side of the first electrode layer CF-ITO2 away from the LC layer. An insulating layer 04 is disposed between the second electrode layer CF-ITO1 and the first electrode layer CF-ITO2. The first compensation electrode layer is disposed on a side of the second electrode layer CF-ITO1 and contacts the second electrode layer CF-ITO1. As shown in FIG. 11, the first compensation electrode layer is disposed on a side of the second electrode layer CF-ITO1 facing the LC layer. In some embodiments, the first compensation electrode layer may also be disposed on the side of the second electrode layer CF-ITO1 away from the LC layer. As shown in FIG. 11, the through-hole 07 is disposed at the second electrode layer CF-ITO1, then, the first compensation electrode layer is not disposed over the overlapping portion of the gap 06 and the through-hole 07. As shown in FIG. 11, each of a gap 061 and a gap 062 partially overlaps with the through-hole 07, then the first compensation electrode layer is not provided over the overlapping portion of the through-hole 07 with each of the two gaps 061 and 062. The first compensation electrode layer is disposed over the portion where the two gaps do not overlap with the through-hole 07. The gap 063 is disposed in the through-hole 07. As such, the first compensation electrode layer is not disposed over the gap 63 to avoid the effect on an adjustment capacitive reactance load function of the through-hole 07.

Figure 12:
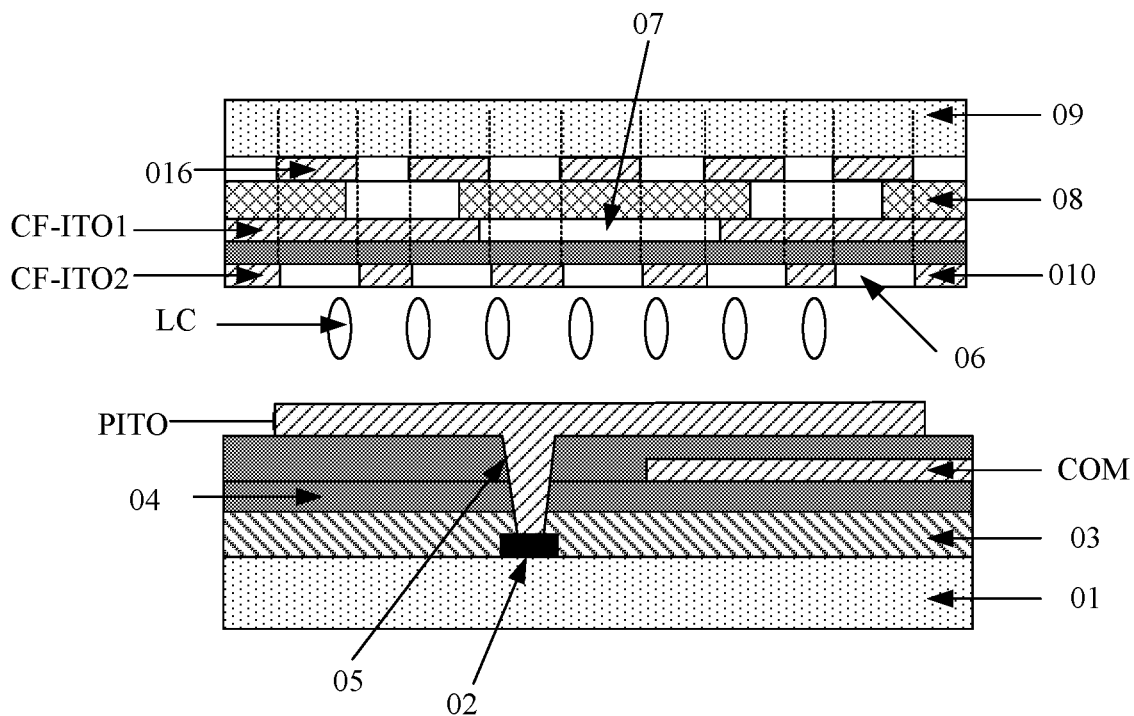
FIG. 12 illustrates a schematic structural diagram of another liquid crystal module according to some embodiments of the present disclosure.

In some embodiments, FIG. 12 illustrates a schematic structural diagram of another liquid crystal module according to some embodiments of the present disclosure. Based on the embodiments shown in FIG. 9, the color film substrate includes a second transparent substrate 09. The first compensation electrode layer is disposed on a side of the second transparent substrate 09, and the first compensation electrode layer contacts the second transparent substrate 09. As shown in FIG. 12, the first compensation electrode layer is disposed on a surface of the second transparent substrate 09 facing the LC layer. In some embodiments, the first compensation electrode layer is disposed over a surface of the second transparent substrate 09 away from the LC layer. The second transparent substrate 09 includes a glass plate.

The set position of the first compensation electrode layer is not limited to the method described in the embodiment of the present disclosure. The first compensation electrode layer may be set on a side of any layer structure in the liquid crystal module. For example, the first compensation electrode layer may be set on a side of the insulating layer.

For example, in FIG. 9 to FIG. 12, the reset electrode assembly includes the second electrode layer CF-ITO1 and the first electrode layer CF-ITO2. The through-hole 07 of the second electrode layer CF-ITO1 may also cause an optical path difference between the light passing through the second electrode layer CF-ITO1 and the light passing through the through-hole 07. The liquid crystal module further includes a second compensation electrode layer to solve the optical path difference caused by the through-hole 07. The orthographic projection of the second compensation electrode layer on the second electrode layer CF-ITO1 covers at least a part of the through-hole 07. The orthographic projection of the second compensation electrode layer on the second electrode layer CF-ITO1 is adjacent to the edge of the through-hole 07. The second electrode layer CF-ITO1 and the second compensation electrode layer are transparent electrodes with the same refractive index and the same thickness. The arrangement method of the second compensation electrode layer may refer to the arrangement method of the first compensation electrode layer, and may be disposed on a side of any layer structure of the liquid crystal module.

If the reset electrode assembly includes the second electrode layer CF-ITO1 and the first electrode layer CF-ITO2, at least the first compensation electrode layer is disposed, or the first compensation electrode layer and the second compensation electrode layer may be disposed at the same time. In some embodiments, the first compensation electrode layer and the second compensation electrode layer are both disposed on a side of the pixel electrode PITO, so that other capacitance is not introduced, and the impedance of the pixel electrode PITO may be greatly reduced.

Figure 13:
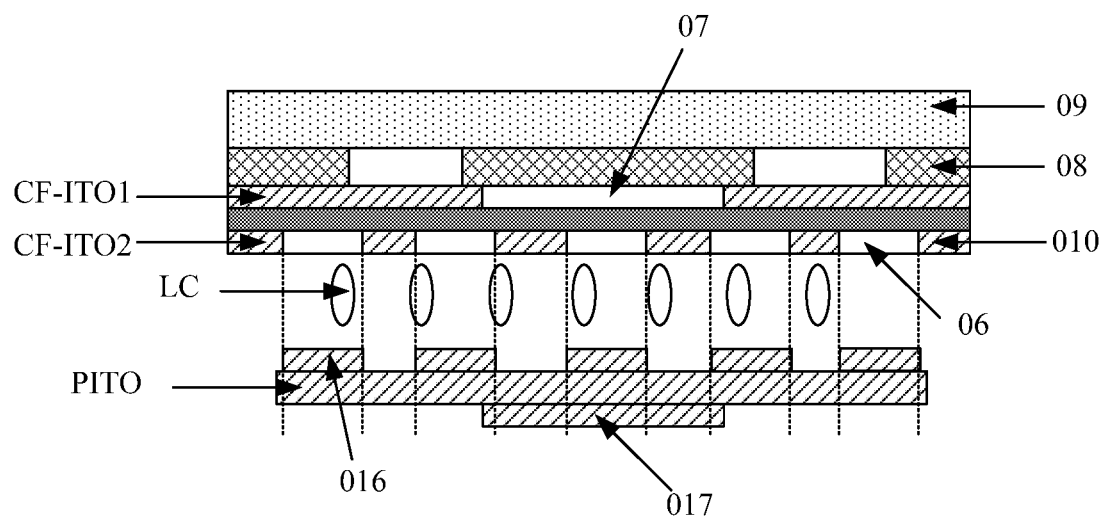
FIG. 13 illustrates a schematic structural diagram of another liquid crystal module according to some embodiments of the present disclosure.

FIG. 13 illustrates a schematic structural diagram of another liquid crystal module according to some embodiments of the present disclosure. In some embodiments, the reset electrode assembly includes the second electrode layer CF-ITO1 and a first electrode layer CF-ITO2. The first compensation electrode layer and a second compensation electrode layer 017 are provided at the same time, which are disposed at two opposite sides of the pixel electrode PITO. As shown in FIG. 13, the first compensation electrode layer is disposed over the surface of the pixel electrode PITO facing the LC layer. The second compensation electrode layer 017 is disposed over the surface of the pixel electrode PITO away from the LC layer. In some embodiments, the first compensation electrode layer and a second compensation electrode layer 017 are both disposed on a same side of the pixel electrode PITO, or, the second compensation electrode layer 017 is disposed on the surface of the pixel electrode PITO facing the LC layer, and the first compensation electrode layer is disposed on the surface of the pixel electrode PITO away from the LC layer.

As shown in FIG. 9 to FIG. 12, the reset electrode assembly includes the second electrode layer CF-ITO1 and the first electrode layer CF-ITO2. In some embodiments, the reset electrode may only include the second electrode layer CF-ITO1, such that only the problem of the optical path difference caused by the gap in the first electrode layer CF-ITO2 needs to be solved.

Figure 14:
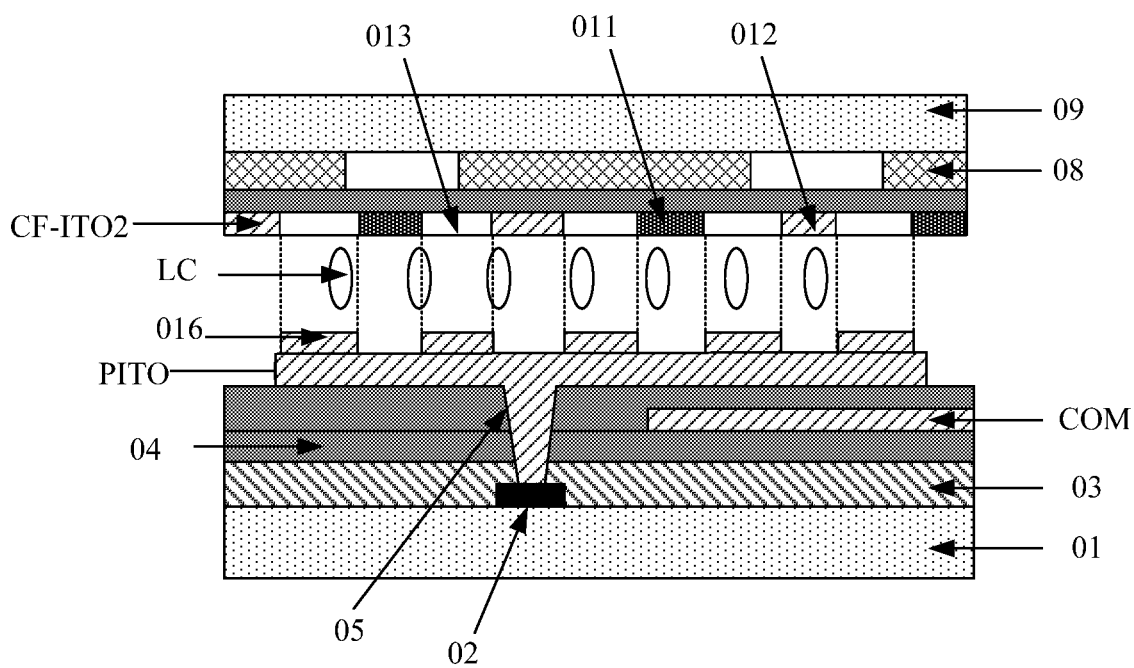
FIG. 14 illustrates a schematic structural diagram of another liquid crystal module according to some embodiments of the present disclosure.

FIG. 14 illustrates a schematic structural diagram of another liquid crystal module according to some embodiments of the present disclosure. In some embodiments, the structure of the reset electrode assembly is the same as the structure shown in FIG. 4. The structure only includes the first electrode layer CF-ITO2. The first electrode layer CF-ITO2 includes a plurality of strip-shaped electrodes with a gap 013 between the adjacent strip-shaped electrodes. The plurality of strip electrodes include a plurality of first strip electrodes 011 and second strip electrodes 012 disposed alternately. As such, only the first compensation electrode layer corresponding to the gap 013 is disposed. To prevent the first compensation electrode layer from generating additional capacitance and reduce the impedance of the pixel electrode PITO at the same time, the first compensation electrode layer is configured on a side of the pixel electrode PITO. In some embodiments, the first compensation electrode layer may also be disposed on a side of the first transparent substrate 01, or a side of the second transparent substrate 09, or a side of other structural layers.

The liquid crystal module of embodiments of the present disclosure may be used in a spatial light modulator. The spatial light modulator includes a phase modulation panel and an amplitude modulation panel that are oppositely disposed. The phase modulation panel includes the liquid crystal module, and/or the amplitude modulation panel includes the liquid crystal module. The spatial light modulator can significantly improve the image display quality when performing a 3D holographic display.

In some other embodiments, a spatial light modulator is provided. The spatial light modulator includes a liquid crystal module. As shown in the above-described drawings, the liquid crystal module includes an array substrate, and a color film substrate. The array substrate and the color film substrate are oppositely disposed. The liquid crystal module also includes an LC layer between the array substrate and the color film substrate. The array substrate includes a pixel electrode and a capacitor metal layer on a side of the pixel electrode away from the LC layer. The capacitor metal layer and the pixel electrode form a storage capacitor. The color film substrate has a reset electrode assembly. In the reset period, the reset electrode assembly is configured to access to a reset voltage signal to orient the liquid crystal molecules along the first orientation direction. The reset electrode assembly includes an adjustment structure. In the reset period, the adjustment structure is configured to reduce the capacitive reactance load of the reset electrode assembly on the pixel electrode when the reset voltage signal is turned off.

Figure 15:
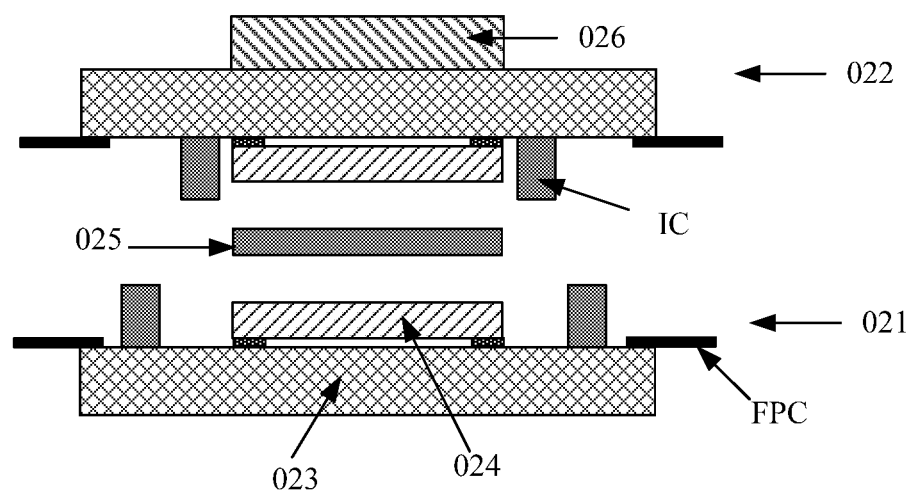
FIG. 15 illustrates a schematic structural diagram of a spatial light modulator according to some embodiments of the present disclosure.

FIG. 15 illustrates a schematic structural diagram of a spatial light modulator according to some embodiments of the present disclosure. The spatial light modulator includes a phase modulation panel 021 and an amplitude modulation panel 022, which are oppositely disposed. The phase modulation panel 021 includes the liquid crystal module. The amplitude modulation panel 022 includes the liquid crystal module. As such, the phase modulation panel 021 and the amplitude modulation panel 022 both adopt the liquid crystal module structures of the above-described embodiments. The liquid crystal module includes an array substrate 23 and a color film substrate 024 oppositely disposed and an LC layer therebetween (not shown in FIG. 15).

The working principle of the spatial light modulator is that the phase modulation of the adjacent pixel light is completed through the phase modulation panel 021. The light vibration direction is parallel to the main plane. The refractive index of linear-polarized light is adjusted within the range of the pixel using different orientations of the liquid crystal molecules to adjust the optical path difference of the adjacent pixels. After the phase modulation, the light enters the amplitude modulation panel 022, where birefringence occurs. The amplitude modulation is finally realized by a polarizer 026. As such, the optical path difference due to the electrode layer pattern of the reset electrode assembly is compensated through the compensation electrode.

The phase modulation panel 021 and the amplitude modulation panel 022 may be attached and fixed through an adhesive layer 025. Both two liquid crystal modules of an array substrate 023 include driving chips ICs. The driving chips are disposed on the side of the array substrate 023 facing the color film substrate 024, and the color film substrate 024 is not stacked over the drive chips ICs. The circuit of the array substrate 023 may be connected to an external circuit through a flexible circuit board (FPC). The two driving chips of the two liquid crystal modules are not stacked over each other to reduce the thickness of the spatial light modulator. A polarizer 026 is configured on a side of the amplitude modulation panel 022 away from the phase modulation panel 021.

In the spatial light modulator, the phase modulation panel 021 and the amplitude modulation panel 022 both include the above-described liquid crystal modules. In the liquid crystal module, the reset electron assembly at least includes the first electrode layer. The first electrode layer includes the plurality of strip-shaped electrodes. The plurality of strip-shaped electrodes are disposed along the first direction. A gap is disposed between two adjacent strip-shaped electrodes. For the structure of the reset electrode assembly, reference may be made to the above-described embodiments, which is not repeated here.

Figure 16:
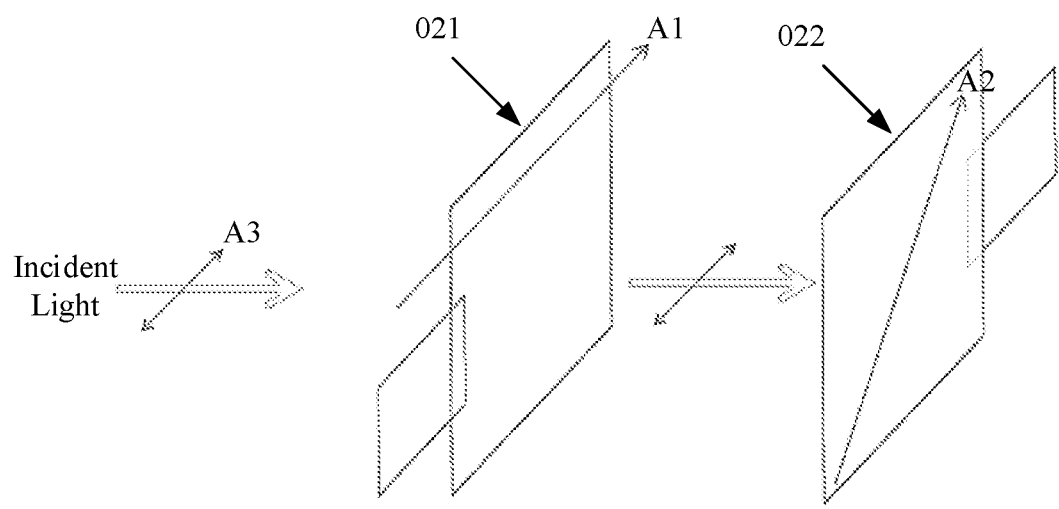
FIG. 16 illustrates a schematic diagram of alignment direction principle of two liquid crystal modules in the spatial light modulator of FIG. 15 according to some embodiments of the present disclosure.

FIG. 16 illustrates a schematic diagram of alignment direction principle of two liquid crystal modules in the spatial light modulator of FIG. 15 according to some embodiments of the present disclosure. In the spatial light modulator, an alignment direction A1 of the phase modulation panel 021 and an alignment direction A2 of the amplitude modulation panel 022 need to form an angle of 45° to adjust the phase and amplitude. The light incident on the liquid crystal grating is linear-polarized light. A polarization direction is A3. The polarization direction A3 is parallel to the alignment direction A1 of the phase modulation panel 021. After the phase adjustment is performed on the light incident on the liquid crystal grating through the phase modulation panel 021, only the optical path is changed but the polarization state is not changed. Therefore, the polarization direction of the linear-polarized light exiting through the phase modulation panel 021 and the alignment direction A2 of the amplitude modulation panel 022 form an angle of 45°. After the linear-polarized light is adjusted by the amplitude of the amplitude modulation panel 022, the polarization state is changed to form circular-polarized light. The amplitude may be controlled through one polarizer 026. In the phase modulation panel 021, the strip-shaped electrodes of the first electrode layer CF-ITO2 are parallel to its alignment direction A1. In the amplitude modulation panel 022, the strip-shaped electrodes of the first electrode layer CF-ITO2 are parallel to its alignment direction A2. Therefore, the extension direction of the strip-shaped electrodes in the phase modulation panel 021 and the extension direction of the strip electrodes in the amplitude modulation panel 022 are configured to form an angle of 45°, such that the phase modulation and amplitude modulation may be realized on the incident polarized light in sequence.

In the spatial light modulator, the liquid crystal module includes the liquid crystal module described in above-described embodiments. The reset electrode assembly includes at least the first electrode layer CF-ITO2. The first electrode layer CF-ITO2 includes the plurality of strip-shaped electrodes. The plurality of strip-shaped electrodes are disposed along the first direction, and a gap is disposed between adjacent strip-shaped electrodes. To eliminate the problem of the optical path difference caused by the gap in the first electrode layer CF-ITO2, the reset electrode assembly also includes the first compensation electrode layer. The orthographic projection of the compensation electrode layer on the first electrode layer at least partially covers the gap.

In the spatial light modulator, both liquid crystal modules have the first compensation electrodes corresponding to the gaps in the respective first electrode layers CF-ITO2, which provide the optical path compensation for the gaps in the respective first electrode layers CF-ITO2. For the implementations, reference may be made to above-described embodiments, which are not repeated here.

Figure 17:
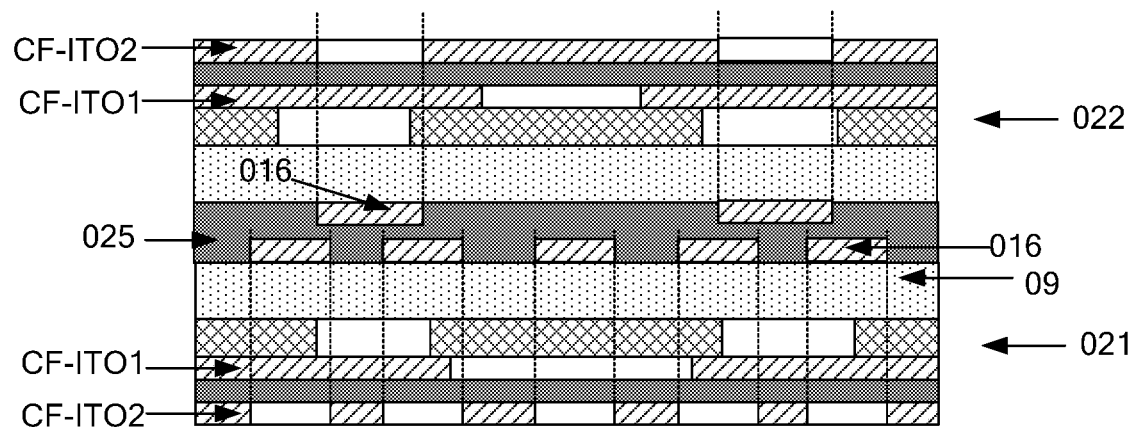
FIG. 17 illustrates a schematic structural diagram of another spatial light modulator according to some embodiments of the present disclosure.

FIG. 17 illustrates a schematic structural diagram of another spatial light modulator according to some embodiments of the present disclosure. The first compensation electrode layer is also disposed according to FIG. 17. The spatial light modulator includes the phase modulation panel 021 and the amplitude modulation panel 022 that are oppositely disposed, both of which include the above-described liquid crystal modules. FIG. 17 only shows the color film substrates of the phase modulation panel 021 and the amplitude modulation panel 022. For the array substrate structure of the phase modulation panel 021 and the amplitude modulation panel 022, reference may be made to the above-described embodiments, which are not repeated here. The color film substrates of the phase modulation panel 021 and the amplitude modulation panel 022 are attached and fixed through the adhesive layer 025. The first compensation electrode layer of at least one liquid crystal module is disposed between the phase modulation panel 021 and the amplitude modulation panel 022.

As shown in FIG. 17, both of the liquid crystal modules are disposed between the phase modulation panel 021 and the amplitude modulation panel 022. Since the extension directions of the strip-shaped electrodes in the first electrode layers CF-ITO2 of the two liquid crystal modules are different, the gaps between the respective strip-shaped electrodes of the two liquid crystal modules and the widths of the respective strip-shaped electrodes of the two liquid crystal modules are different. As such, the sizes of the first compensation electrode layers 016 of the two liquid crystal modules are different. The first compensation electrode layer of the phase modulation panel 021 is disposed over the surface of a side of the second transparent substrate 09 away from its LC layer. The first compensation electrode layer of the amplitude modulation panel is disposed over the surface of a side of the second transparent substrate 09 away from its LC layer.

Figure 18:
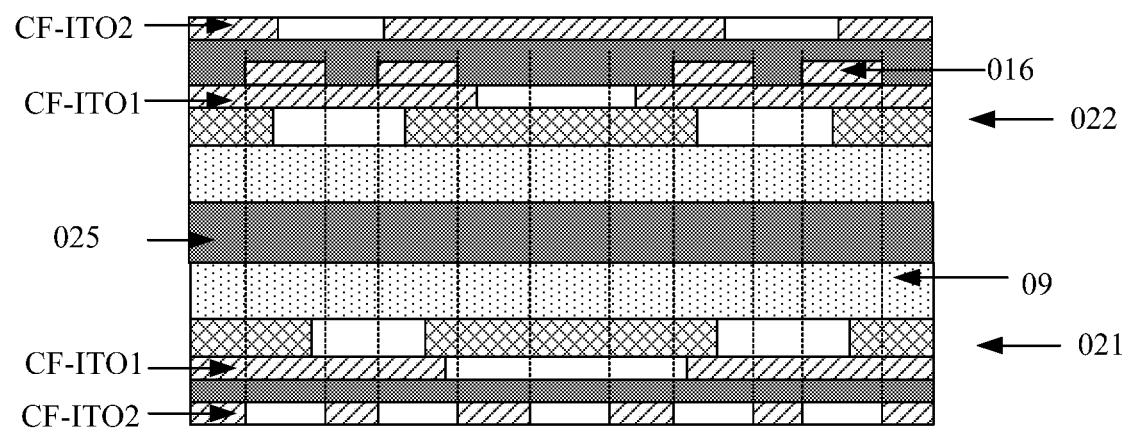
FIG. 18 illustrates a schematic structural diagram of another spatial light modulator according to some embodiments of the present disclosure.

FIG. 18 illustrates a schematic structural diagram of another spatial light modulator according to some embodiments of the present disclosure. The first compensation electrode layer may also be disposed according to FIG. 18. The spatial light modulator includes the phase modulation panel 021 and the amplitude modulation panel 022 oppositely disposed. In some embodiments, the phase modulation panel 021 includes the liquid crystal module. The first compensation electrode layer is disposed in the amplitude modulation panel 022 to compensate for the gap in the first electrode layer CF-ITO2 in the phase modulation panel 021. In some embodiments, the first compensation electrode layer is disposed on a side of the LC layer of the amplitude modulation panel 022 facing the phase modulation panel 021 and inside the amplitude modulation panel 022. The first compensation electrode layer is configured corresponding to the gap in the first electrode layer CF-ITO2 of the phase modulation panel 021.

Figure 19:
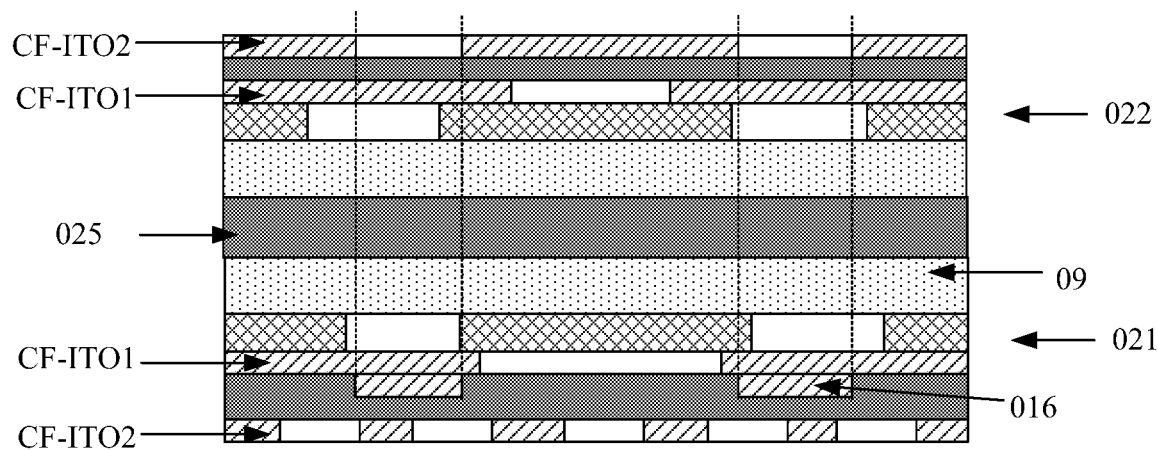
FIG. 19 illustrates a schematic structural diagram of another spatial light modulator according to some embodiments of the present disclosure.

FIG. 19 illustrates a schematic structural diagram of another spatial light modulator according to some embodiments of the present disclosure. The first compensation electrode layer may also be disposed according to FIG. 19. The spatial light modulator includes the phase modulation panel 021 and the amplitude modulation panel 022 oppositely disposed. In some embodiments, the amplitude modulation panel 022 includes the liquid crystal module. The first compensation electrode 016 is disposed in the phase modulation panel 021 to compensate for the gap in the first electrode layer CF-ITO2 in the amplitude modulation panel 022. In some embodiments, the first compensation electrode layer is disposed on a side of the LC layer of the phase modulation panel 021 facing the amplitude modulation panel 022 and inside the phase modulation panel 021. The first compensation electrode 016 is configured corresponding to the gap in the first electrode layer CF-ITO2 of the amplitude modulation panel 022.

In the spatial light modulator, if the reset electrode assembly of the liquid crystal module includes a second electrode layer CF-ITO1 with a through-hole, a second compensation electrode layer may be disposed for the liquid crystal module to eliminate an optical path difference caused by the through-hole of the second electrode layer CF-ITO1. For the liquid crystal module in the spatial light modulator, the second compensation electrode layer of a liquid crystal module may be disposed in the liquid crystal module, or another liquid crystal module. For the arrangement method, reference may be made to the arrangement method of the first compensation electrode layer, which is not repeated here.

The spatial light modulator according to embodiments of the present disclosure adopts the liquid crystal module described in above-described embodiments. The capacitive reactance load on the pixel electrode may be reduced or eliminated through the adjustment structure in the reset electrode assembly. The optical path difference caused by the electrode pattern may further be reduced or eliminated by arranging the compensation electrode layer to improve the image quality of the spatial light modulator for the 3D holographic display.

Figure 20:
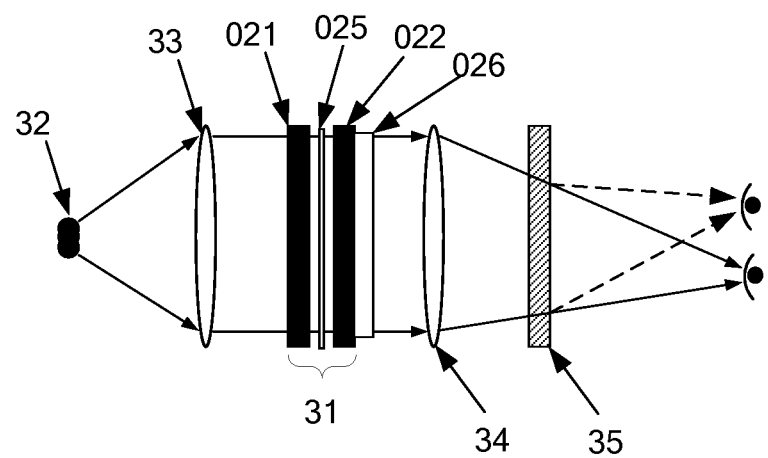
FIG. 20 illustrates a schematic structural diagram of a 3D holographic display device according to some embodiments of the present disclosure.

In some other embodiments, a holographic 3D display apparatus is provided in FIG. 20. FIG. 20 illustrates a schematic structural diagram of a 3D holographic display apparatus according to some embodiments of the present disclosure. The 3D holographic display apparatus includes a spatial light modulator 31. The spatial light modulator 31 includes the spatial light modulator of above-described embodiments. The spatial light modulator 31 is configured to perform the phase modulation and the amplitude modulation on light emitted from the beam expansion and collimation assembly in sequence. The spatial light modulator includes the phase modulation panel 021 and the amplitude modulation panel 022, and the phase modulation panel 021 and the amplitude modulation panel 022 are attached and fixed through the adhesive layer 025. The polarizer 026 is disposed on the side of the amplitude adjustment panel 022 away from the phase adjustment panel 021. As shown in FIG. 20, the polarizer 026 is disposed on the light-emitting side surface of the amplitude modulation panel 022. In some other embodiments, the polarizer may also be integrated on the surface of a field lens 34 or a liquid crystal grating 35. The liquid crystal grating 35 includes 2 to 3 liquid crystal panels.

As shown in FIG. 20, the 3D holographic display apparatus also includes a light source device 32, a beam expansion and collimation assembly 33, the spatial light modulator 31, the field lens 34, and the liquid crystal grating 35. The light source device 32 is configured to sequentially emit RGB tri-color light. The beam expansion and collimation assembly 33 is configured to perform expansion and collimation on the light emitted from the light source device 32. The emitted light then enters the spatial light modulator 31. The field lens is at least configured to increase an ability of edge light of light emitted from the spatial light modulator 31 incident on the liquid crystal grating 35. The liquid crystal grating 35 is configured to form a left-eye image and a right-eye image based on the light incident on the liquid crystal grating.

Figure 21:
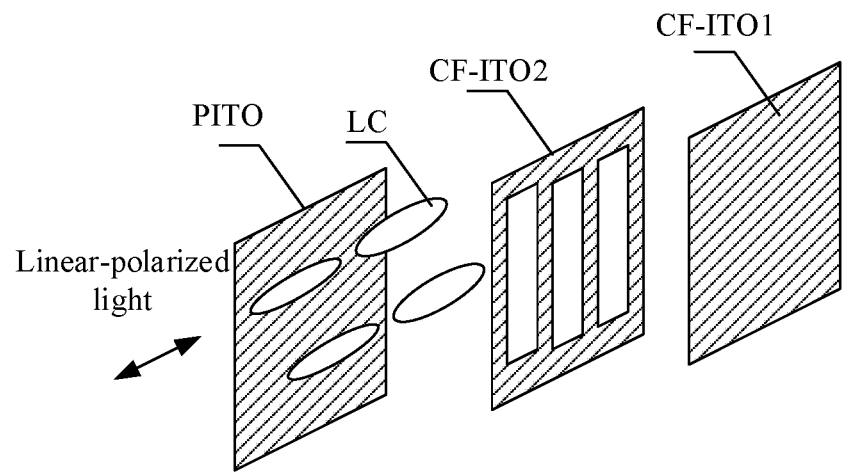
FIG. 21 illustrates a schematic diagram of a principle of diffraction in a phase modulation panel according to some embodiments of the present disclosure.

FIG. 21 illustrates a schematic diagram of a principle of diffraction in a phase modulation panel according to some embodiments of the present disclosure. As shown in FIG. 21, the reset electrode assembly includes the first electrode layer CF-ITO2 and the second electrode layer CF-ITO1. In some other embodiments, the reset electrode assembly may only include the first electrode layer CF-ITO2. The first electrode layer CF-ITO2 has strip-shaped gaps, such that the first electrode layer CF-ITO2 has the plurality of strip-shaped electrodes.

As shown in FIG. 21, the strip-shaped gap in the first electrode layer CF-ITO2 is perpendicular to the incident polarized light and parallel to the upright direction of the image displayed by the holographic 3D display apparatus. As such, the strip-shaped electrode of the first electrode layer CF-ITO2 is perpendicular to the incident polarized light and parallel to the upright direction of the image displayed by the holographic 3D display apparatus. Therefore, the diffraction direction of the strip-shaped gap may be perpendicular to the upright direction of the image displayed by the holographic 3D display apparatus. When the user views the display image, the connection line direction of the two eyes is perpendicular to the upright direction of the displayed image of the holographic 3D display apparatus. Therefore, this method causes the diffraction direction of the strip-shaped gap to be parallel to the connection line direction of the two eyes, which increases the diffraction effect perceived by the user, so as to make the diffraction effect perceived by the user more serious, which affects the user's viewing quality. In some embodiments, the upright direction of the displayed image of the holographic 3D display apparatus is perpendicular to the polarization direction of the incident polarized light.

Figure 22:
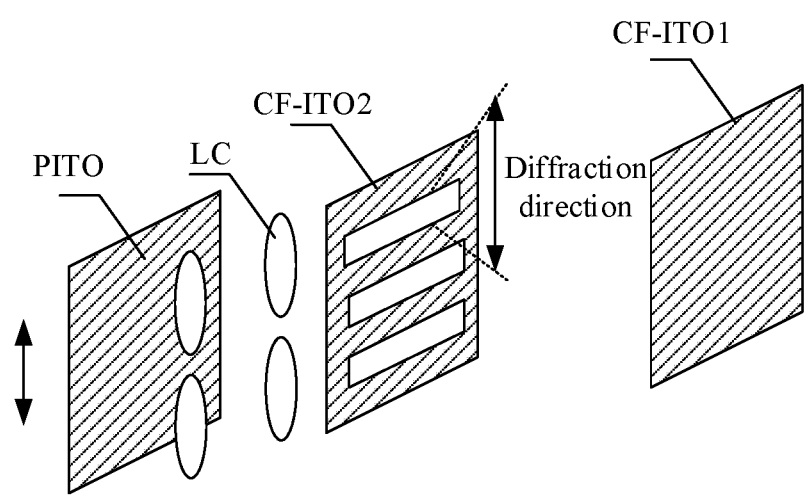
FIG. 22 illustrates a schematic diagram of a principle of diffraction in another phase modulation panel according to some embodiments of the present disclosure.

FIG. 22 illustrates a schematic diagram of a principle of diffraction in another phase modulation panel according to some embodiments of the present disclosure. As shown in FIG. 22, the phase modulation panel 021 includes the above-described liquid crystal module, and the phase adjustment panel 021 includes the reset electrode assembly. The reset electrode assembly at least includes the first electrode layer CF-ITO2. The first electrode layer CF-ITO2 includes the plurality of strip-shaped electrodes, and the plurality of strip-shaped electrodes are disposed along the first direction. The gap is disposed between adjacent strip-shaped electrodes. The extending direction of the strip-shaped electrode is perpendicular to the upright direction of the image displayed by the holographic 3D display apparatus. In some embodiments, the upright direction of the image displayed by the holographic 3D display apparatus is parallel to the polarization direction of the incident polarized light. Since the extending direction of the strip-shaped electrode is perpendicular to the upright direction of the image displayed by the holographic 3D display apparatus, the diffraction direction is parallel to the upright direction of the image displayed by the holographic 3D display apparatus. As such, the diffraction direction is vertical to the connection line direction of the user's eyes. Therefore, the strip-shaped gap diffraction effect of the first electrode layer CF-ITO2 is reduced on the image display quality, and the image display quality and viewing comfort are improved.

As shown in FIG. 22, a distance between the pixel electrode PITO and the first electrode layer CF-ITO2 is 3 μm. A distance between the first electrode layer CF-ITO2 and the second electrode layer CF-ITO1 is 100 nm to 200 nm. The pixel electrode PITO is configured to access the display voltage, and the second electrode layer CF-ITO1 is configured to access the reset voltage. The second electrode layer CF-ITO1 may be directly connected to the ground, so as to form a voltage difference between the second electrode layer CF-ITO1 and the first electrode layer CF-ITO2.

In the holographic 3D display apparatus provided by embodiments of the present disclosure, the spatial light modulator adopts the above-described liquid crystal module. The capacitive reactance load of the PITO may be reduced or eliminated through the adjustment structure in the reset electrode assembly. The optical path difference caused by the electrode pattern may also be reduced or eliminated by configuring the compensation electrode layer to improve the image quality of the spatial light modulator for the 3D holographic display.

In some other embodiments, a driving method of the above-described liquid crystal module is provided. For the driving method, a drive cycle of a frame is equally divided into a first driving period, a second driving period, and a third driving period. The first driving period includes a first reset period of the liquid crystal molecule corresponding to first color pixels. The second driving period includes a second reset period of the liquid crystal molecule corresponding to second color pixels. The third driving period includes a third reset period of the liquid crystal molecule corresponding to third color pixels.

Figure 23:
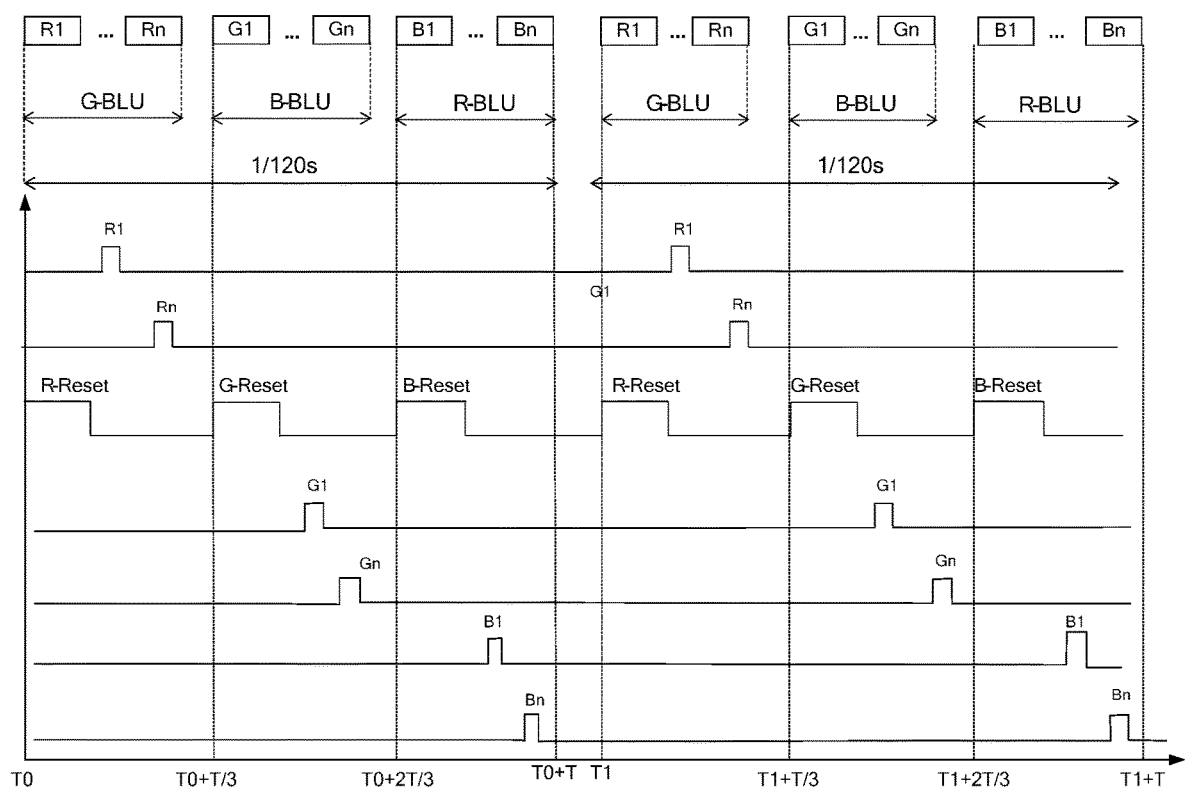
FIG. 23 illustrates a schematic diagram of a driving time sequence of a liquid crystal module according to some embodiments of the present disclosure.
Figure 24:
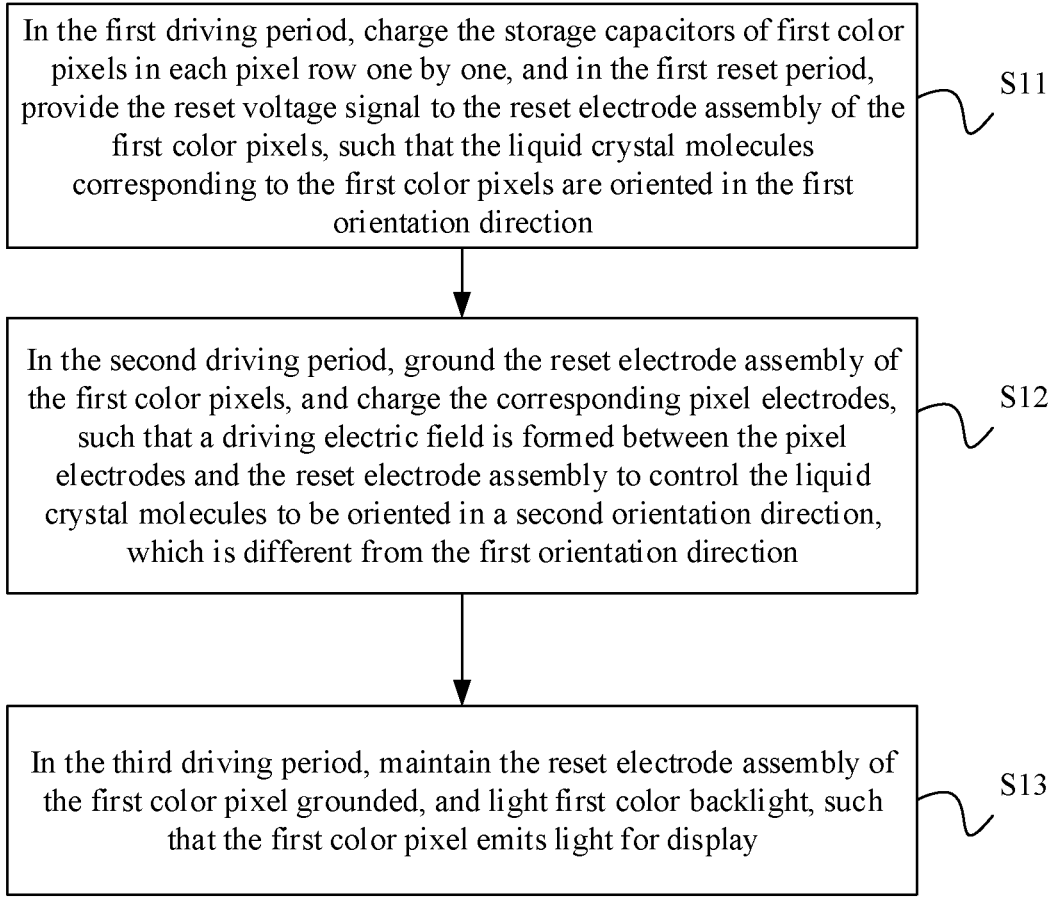
FIG. 24 illustrates a schematic flowchart of a driving method according to some embodiments of the present disclosure.

For example, the first color pixels may include red pixels, the second color pixels may include green pixels, and the third color pixels may include blue pixels. The driving method is described in detail in connection with the time sequence shown in FIG. 23, and the driving method is shown in FIG. 24. FIG. 23 illustrates a time sequence diagram of driving a liquid crystal module according to some embodiments of the present disclosure. FIG. 24 illustrates a schematic flowchart of a driving method according to some embodiments of the present disclosure. FIG. 23 shows the time sequences of two adjacent cycles, and the cycle is T. In the two adjacent cycles, a first cycle is from T0 to T0+T. The first cycle is equally divided into three driving periods. A first driving period is from T0 to T0+T/3, a second driving period is from T0+T/3 to T0+2T/3, and a third driving period is from T0+2T/3 to T0+T. A second cycle is T1 to T1+T. The second cycle is equally divided into three driving periods. A first driving period is from T1 to T1+T/3, a second driving period is from T1+T/3 to T1+2T/3, and a third driving period is from T1+2T/3 to T1+T. A cycle gap is T1−T−T0. The tri-color pixels are RGB primary color pixels, and the order of the three may not be limited to the order described in embodiments of the present disclosure. For example, a drive cycle of a frame is 1/120 s, and a frequency is 120 Hz in FIG. 23. The refresh frequency and drive cycle may be set based on display requirements, which is not limited to the method described in embodiments of the present disclosure.

As shown in FIG. 24, the driving method includes the following processes.

At S11, in the first driving period, the storage capacitors of the first color pixels in each pixel row are charged one by one. In the first reset period, the reset voltage signal may be provided to the reset electrode assembly of the first color pixels, such that the liquid crystal molecules corresponding to the first color pixels are oriented in the first orientation direction.

In this process, for the red pixels, as shown in FIG. 23, in the first driving period, the storage capacitors of the red pixels of the pixels in each pixel row are charged one by one based on the control signals R1-Rn. In the first reset period, the reset voltage signal R-Reset is provided for the reset electrode assembly of the red pixels, such that the liquid crystal molecules corresponding to the red pixels are in the first orientation direction to complete the reset.

At S12, in the second driving period, the reset electrode assembly of the first color pixels is grounded, and the storage capacitor of the first color pixels charges the corresponding pixel electrodes, so that a driving electric field is formed between the pixel electrodes and the reset electrode assembly. The formed driving electric field may control the liquid crystal molecules to be oriented in a second orientation direction, which is different from the first orientation direction.

In this process, for the red pixels, as shown in FIG. 23, in the second driving period, the reset electrode assembly of the red pixels is grounded, such that the potential of the electrode layer in the reset electrode assembly is 0V. The storage capacitance of the red pixels charges the pixel electrodes corresponding to the red pixels, such that a driving electric field is formed between the pixel electrodes and the reset electrode. The formed driving electric field may control the liquid crystal molecules to be in the second orientation direction to complete the deflection of the liquid crystal molecules required by the display.

At S13, in the third driving period, the reset electrode assembly of the first color pixels is maintained grounded, and the first color backlight is lighted, such that the first color pixels emit light for display.

In this process, for the red pixels, as shown in FIG. 23, in the third driving period, the reset electrode of the red pixels is maintained grounded, and the red backlight is turned on by the control signal R-BLU to make the red pixels emit light for display.

For adjacent driving periods of two cycles, in the second driving period and the third driving period of the previous frame drive cycle, and the first driving period of the following frame drive cycle, the second color pixels are driven to emit light for display according to the same driving method of the first color display. In this process, for green pixels, in the period of T0+T/3 to T0+2T/3, T0+2T/3 to T0+T, and T1 to T1+T/3, the green pixels emit light for display according to the same driving method as the red pixels.

In the third driving period of the previous frame cycle, and the first driving period and the second driving period of the following frame drive cycle, the third color pixels are driven to emit light for display according to the same driving method of the first color display. In this process, for blue pixels, in the three driving periods of T0+2T/3 to T0+T, T1 to T1+T/3, T1+T/3 to T1+2T/3, the blue pixels emit light for display according to the same driving method of the red pixels.

Based on the above-described periodic driving method, a continuous multi-frame picture display is realized.

In the above driving method, in any driving period, the storage capacitors of corresponding color pixels in each pixel row are charged one by one within the set charging period. The set charging period and the reset period within the driving period do not overlap. For example, the charging period R1-Rn of the red pixels does not overlap with its reset period R-Reset.

In some other embodiments, in any driving period, the storage capacitors of corresponding color pixels in each pixel row are charged one by one in the set charging period. The set charging period and the reset period in any driving period at least partially overlap. As described above, the adjustment element is provided to reduce the capacitive reactance load. Therefore, the refresh frequency may be increased by overlapping the pixel charging period and the reset period, and the capacitive reactance load does not cause an unstable pixel voltage.

As shown in FIG. 23, in any driving period, the duration of the reset period is shorter than the duration of the corresponding driving period. Each cycle is divided into 3 periods, each period has a separate reset period, and the reset period does not exceed T/3. As such, the reset may be speeded up, more charging time is available, the charging time is long, capacitor-discharge time is long, and the display refresh frequency is increased.

Embodiments in this specification are described in a progressive, side-by-side, or progression and side-by-side combined manner. Each embodiment focuses differently from other embodiments. The same and similar parts between the embodiments refer to each other. For the embodiments provided spatial light modulator, the holographic 3D display apparatus, and the driving method of the holographic 3D display apparatus, since the liquid crystal module corresponds to the spatial light modulator disclosed in the embodiments, the description is relatively simple, and the relevant parts are made referred to the description corresponding to the liquid crystal module.

In the description of the present disclosure, the terms of "upper," "lower," "top," "bottom," "inner," "outer," etc., indicate the orientation or positional relationship based on the drawings, which are only for the convenience of describing the present disclosure and simplifying the description, rather than indicating or implying that the device or element referred to must have a specific orientation, or be constructed and operated in a specific orientation. Thus, the terms cannot be considered to limit the present disclosure. When a component is considered to be "connected" to another component, the component may be directly connected to another component, or a center component may exist at the same time.

In the present disclosure, relational terms such as first and second are only used to distinguish one entity or operation from another entity or operation, and do not necessarily require or imply these entities or operations having any such actual relationship or order among them. The terms "including," "containing," or any other variations thereof are intended to encompass non-exclusive inclusion, such that an item or device that includes a series of elements includes not only those elements, but also other elements that are not explicitly listed, or may include elements inherent to such an item or device. Without more restrictions, the elements defined by the sentence "include a . . . " do not exclude the existence of other identical elements in the item or device, which include the above elements.

The above description of the disclosed embodiments enables those skilled in the art to implement or use the present disclosure. Various modifications to these embodiments will be apparent to those skilled in the art. The general principles defined herein may be implemented in other embodiments without departing from the spirit or scope of the disclosure. Therefore, the present disclosure will not be limited to the embodiments shown in the present specification but shall conform to the widest scope consistent with the principles and novel features disclosed in the present specification.

What is claimed is:

1. A liquid crystal module, comprising:
    an array substrate and a color film substrate, disposed oppositely; and
    a liquid crystal layer, disposed between the array substrate and the color film substrate, wherein:
        the array substrate includes a pixel electrode and a capacitor metal layer on a side of the pixel electrode away from the liquid crystal layer and the capacitor metal layer and the pixel electrode form a storage capacitor;
        the color film substrate includes a reset electrode assembly, and in a reset period, the reset electrode assembly is configured to access to a reset voltage signal to orient liquid crystal molecules along a first orientation direction; and
        the reset electrode assembly includes an adjustment structure, in the reset period, the adjustment structure is configured to reduce a capacitive reactance load of the reset electrode assembly on the pixel electrode when the reset voltage signal is turned off.

2. The liquid crystal module of claim 1, wherein the reset electrode assembly includes:
    a first electrode layer, wherein the first electrode layer has a plurality of strip-shaped electrodes, the plurality of strip-shaped electrodes are disposed along a first direction in sequence, and a gap is between two adjacent strip-shaped electrodes; and
    a second electrode layer, disposed on a side of the first electrode layer away from the liquid crystal layer, wherein:
        the adjustment structure includes a through-hole disposed in the second electrode layer;
        in a direction perpendicular to a plane of the array substrate, the through-hole and the pixel electrode at least partially overlap with each other;
        the first electrode layer is electrically connected to a first signal terminal;
        the second electrode layer is electrically connected to a second signal terminal; and
        reset voltage signals of the first signal terminal and second signal terminal are different.

3. The liquid crystal module of claim 1, wherein the reset electrode assembly includes:
    a first electrode layer, wherein:
        the first electrode layer has a plurality of strip-shaped electrodes, the plurality of strip-shaped electrodes are disposed along a first direction in sequence, and a gap is between two adjacent strip-shaped electrodes;
        the plurality of strip-shaped electrodes include first strip-shaped electrodes and second strip-shaped electrodes that are alternately disposed;
        the first strip-shaped electrodes are electrically connected to a third signal terminal that outputs a first reset voltage;
        the second strip-shaped electrodes are electrically connected to a fourth signal terminal that outputs a second reset voltage;
        a phase of the first reset voltage is in reverse to a phase of the second reset voltage; and
        the adjustment structure includes the first strip-shaped electrodes and the second strip-shaped electrodes.

4. The liquid crystal module of claim 3, wherein an amplitude of the first reset voltage of the first strip-shaped electrodes and an amplitude of the second reset voltage of the second strip-shaped electrodes are same.

5. The liquid crystal module of claim 3, wherein:
    the first electrode layer includes first comb-shaped electrodes and second comb-shaped electrodes that are nested with each other;
    the first comb-shaped electrodes include the first strip-shaped electrodes; and the second comb-shaped electrodes include the second strip-shaped electrodes, wherein:
the first comb-shaped electrodes are electrically connected to the third signal terminal to input the first reset voltage to the first strip-shaped electrodes simultaneously; and
the second comb-shaped electrodes are electrically connected to the fourth signal terminal to input the second reset voltage to the second strip-shaped electrodes simultaneously.

6. The liquid crystal module of claim 1, wherein:
the reset electrode assembly at least includes a patterned first electrode layer;
the first electrode layer includes a plurality of strip-shaped electrodes;
the plurality of strip-shaped electrodes are disposed along a first direction in sequence;
a gap is between two adjacent strip-shaped electrodes; and
the liquid crystal module further includes a first compensation electrode layer, the first compensation electrode layer including a plurality of first compensation electrodes, an orthographic projection of a first compensation electrode on the first electrode layer at least covers a part of the gap.

7. The liquid crystal module of claim 6, wherein the orthographic projection of the first compensation electrode on the first electrode layer is adjoined to the strip-shaped electrodes.

8. The liquid crystal module of claim 6, wherein the first electrode layer and the first compensation electrode layer include transparent electrodes with a same refractive index and a same thickness.

9. The liquid crystal module of claim 6, wherein:
the first compensation electrode layer is disposed on a side of the pixel electrode and contacts the pixel electrode; or
the array substrate includes a first transparent substrate, and the first compensation electrode layer is disposed on a side of the first transparent substrate and contacts the first transparent substrate; or
the reset electrode assembly includes a second electrode layer disposed on a side of the first electrode layer away from the liquid crystal layer, an insulating layer is disposed between the second electrode layer and the first electrode layer, and the first compensation electrode layer is disposed on a side of the second electrode layer and contacts the second electrode layer; or
the color film substrate includes a second transparent substrate, and the first compensation electrode layer is disposed on a side of the second transparent substrate and contacts the second transparent substrate.

10. The liquid crystal module of claim 1, wherein:
the liquid crystal module is used in a spatial light modulator;
the spatial light modulator includes a phase modulation panel and an amplitude modulation panel, disposed oppositely; and
one or more of the phase modulation panel and the amplitude modulation panel include the liquid crystal module.

11. A spatial light modulator, comprising:
a liquid crystal module, comprising:
an array substrate and a color film substrate, disposed oppositely; and
a liquid crystal layer, disposed between the array substrate and the color film substrate, wherein:
the array substrate includes a pixel electrode and a capacitor metal layer on a side of the pixel electrode away from the liquid crystal layer, and the capacitor metal layer and the pixel electrode form a storage capacitor;
the color film substrate includes a reset electrode assembly, and in a reset period, the reset electrode assembly is configured to access to a reset voltage signal to orient liquid crystal molecules along a first orientation direction; and
the reset electrode assembly includes an adjustment structure, in the reset period, the adjustment structure is configured to reduce a capacitive reactance load of the reset electrode assembly on the pixel electrode when the reset voltage signal is turned off.

12. The spatial light modulator of claim 11, wherein:
the reset electrode assembly at least includes a first electrode layer, wherein:
the first electrode layer includes a plurality of strip-shaped electrodes;
the plurality of strip-shaped electrodes are disposed along a first direction; and
a gap is between two adjacent strip-shaped electrodes; and
the spatial light modulator includes a phase modulation panel and an amplitude modulation panel, disposed oppositely;
the phase modulation panel includes the liquid crystal module;
the amplitude modulation panel includes the liquid crystal module; and
an extension direction of the strip-shaped electrodes of the phase modulation panel and an extension direction of the strip-shaped electrodes of the amplitude modulation panel form an angle of 45°.

13. The spatial light modulator of claim 11, wherein the reset electrode assembly at least includes:
a first electrode layer, wherein:
the first electrode layer includes a plurality of strip-shaped electrodes;
the plurality of strip-shaped electrodes are disposed along a first direction; and
a gap is between two adjacent strip-shaped electrodes; and
a first compensation electrode layer, wherein an orthographic projection of the first compensation electrode layer on the first electrode layer at least partially covers the gap.

14. The spatial light modulator of claim 13, wherein the spatial light modulator includes a phase modulation panel and an amplitude modulation panel, disposed oppositely, and the first compensation electrode layer is disposed between the phase modulation panel and the amplitude modulation panel.

15. The spatial light modulator of claim 13, further comprising a phase modulation panel and an amplitude modulation panel that are disposed oppositely, wherein:
one or more of the phase modulation panel and the amplitude modulation panel include the liquid crystal module,
in a case that the liquid crystal module is included in the phase modulation panel, the first compensation electrode layer is disposed in the amplitude modulation panel to provide an optical path compensation for the gap in the phase modulation panel; and
in a case that the liquid crystal module is included in the amplitude modulation panel, the first compensation electrode layer is disposed in the phase modulation panel to provide an optical path compensation for the gap in the amplitude modulation panel.

16. A holographic 3D display apparatus, comprising:
a spatial light modulator, including the spatial light modulator according to claim 11,
a light source device, configured to emit RGB tri-color backlight in a time sequence;
a beam expansion and collimation assembly, configured to perform expansion and collimation on light emitted from the light source device; and
a field lens and a liquid crystal grating, wherein:
  the spatial light modulator is configured to perform a phase modulation and an amplitude modulation on light emitted from the beam expansion and collimation assembly in sequence;
  the field lens is at least configured to increase an ability of edge light of light emitted from the spatial light modulator incident on the liquid crystal grating; and
  the liquid crystal grating is configured to form a left eye image and a right eye image based on the light incident on the liquid crystal grating.

17. The holographic 3D display apparatus of claim 16, wherein:
the spatial light modulator includes a phase modulation panel;
the phase modulation panel includes a reset electrode assembly; and
the reset electrode assembly at least includes a first electrode layer, wherein:
  the first electrode layer includes a plurality of strip-shaped electrodes;
  the plurality of strip-shaped electrodes are disposed along a first direction;
  a gap is between two adjacent strip-shaped electrodes; and
  an extension direction of the strip-shaped electrodes is perpendicular to an upright direction of an image displayed by the holographic 3D display apparatus.

\* \* \* \* \*